United States Patent [19]
Solhjell

[11] Patent Number: 6,166,882
[45] Date of Patent: Dec. 26, 2000

[54] NON-BELT DRIVE TAPE CARTRIDGE

[75] Inventor: Erik Solhjell, Oslo, Norway

[73] Assignee: Tandberg Data ASA, Oslo, Norway

[21] Appl. No.: 09/179,087

[22] Filed: Oct. 27, 1998

[51] Int. Cl.$^7$ .................................................. G11B 23/02
[52] U.S. Cl. ........................................................... 360/132
[58] Field of Search ............................ 360/132; 242/344, 242/347

[56] References Cited

U.S. PATENT DOCUMENTS

| | | | |
|---|---|---|---|
| 5,786,967 | 7/1998 | Gerfast et al. | 360/132 |
| 5,893,526 | 4/1999 | Zwettler | 360/132 |

*Primary Examiner*—Allen T. Cao
*Attorney, Agent, or Firm*—Schiff Hardin & Waite

[57] ABSTRACT

In a magnetic tape cartridge, the tape is transported so as to be wound and unwound from two hubs disposed in a housing by direct contact of said tape with a drive puck. A roller wheel is disposed on an opposite side of said drive puck, with the tape disposed between the drive puck and the roller wheel, so as to maintain the tape in contact with the drive puck during rotation of the drive puck. A braking force can be applied to one or both hubs during winding and unwinding, so as to tension the tape. The components can be dimensioned to make the cartridge compatible with various existing drives for existing cartridge formats.

23 Claims, 9 Drawing Sheets

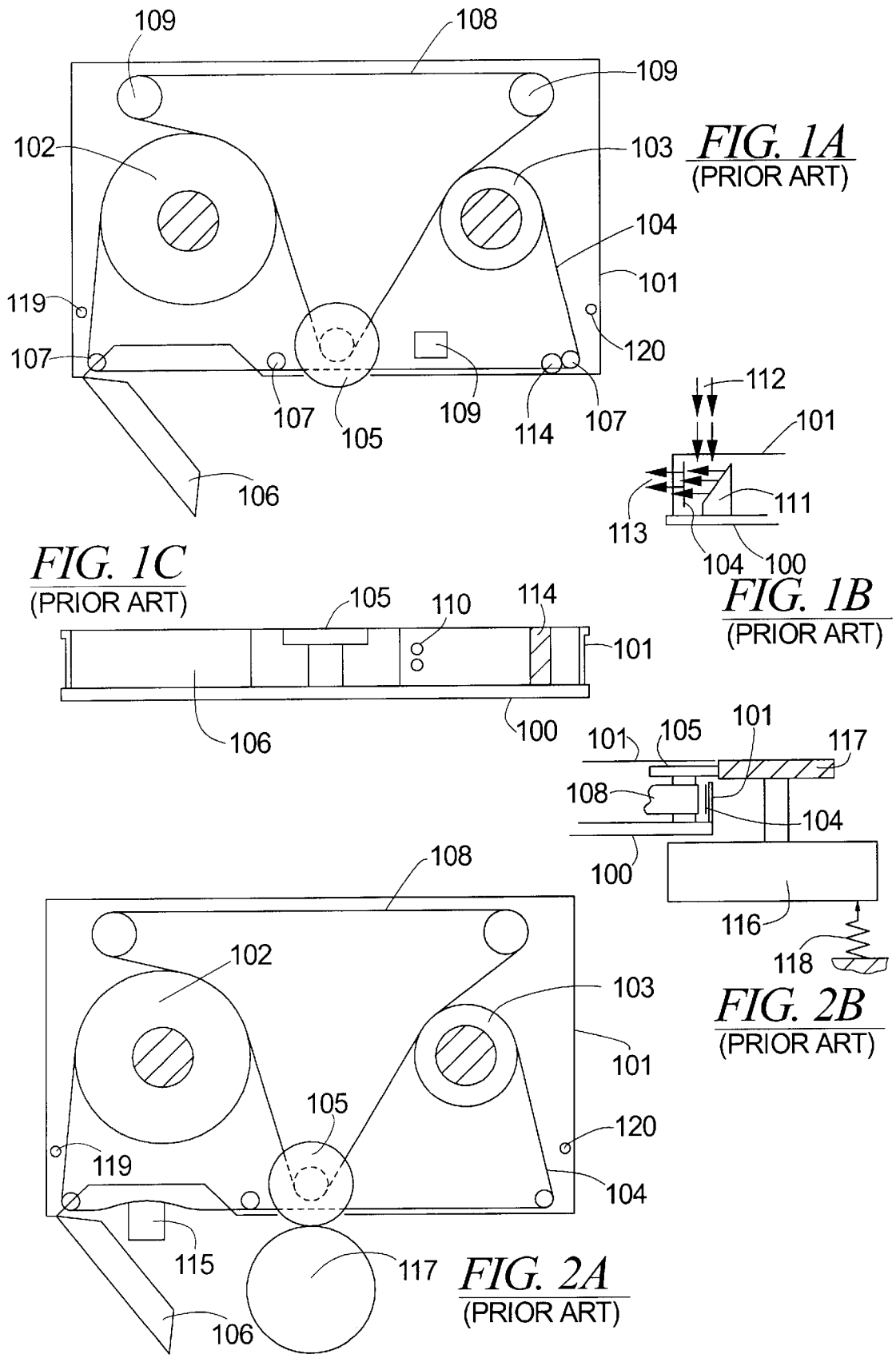

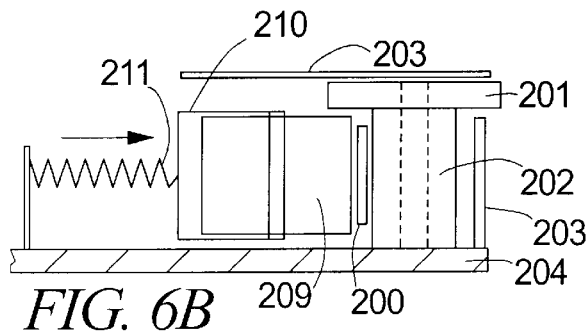
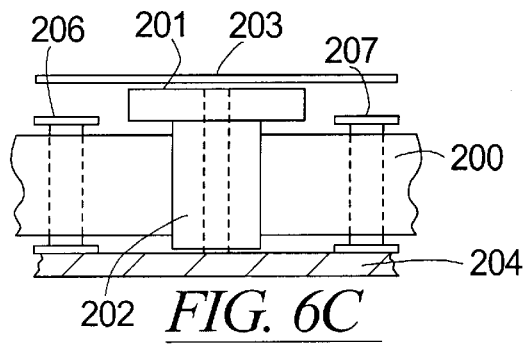
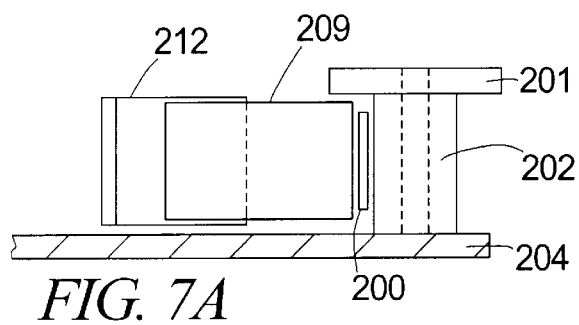
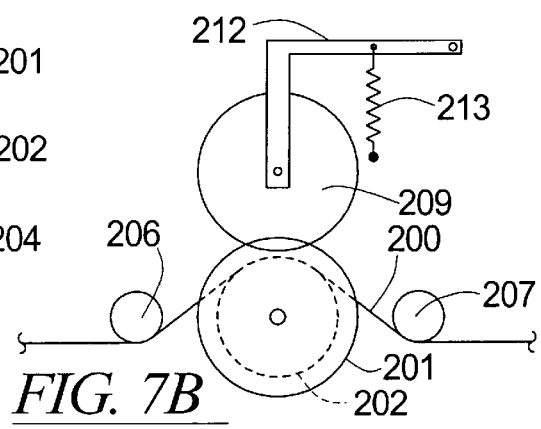
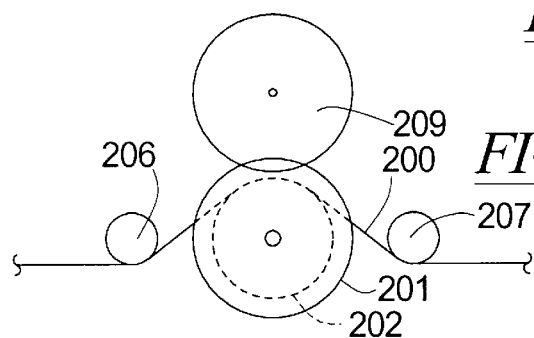
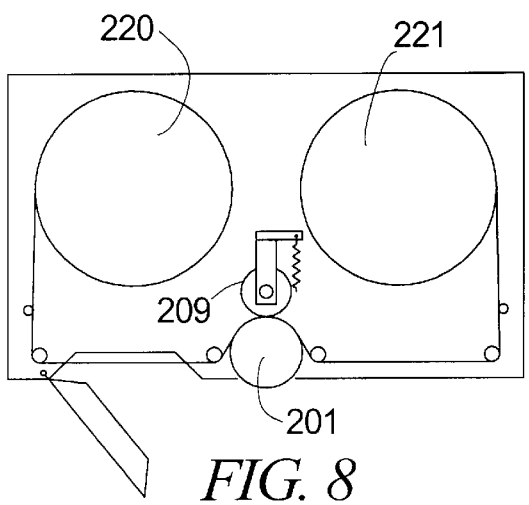
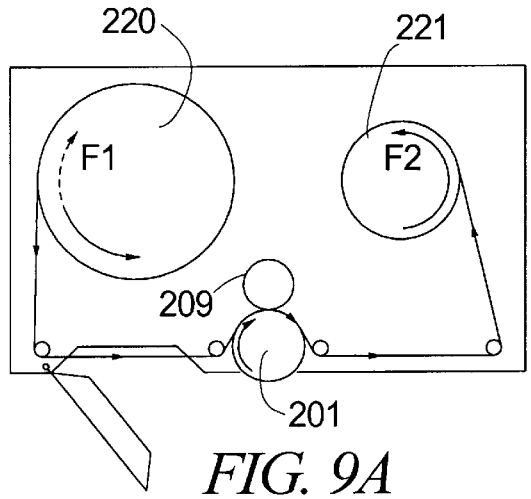

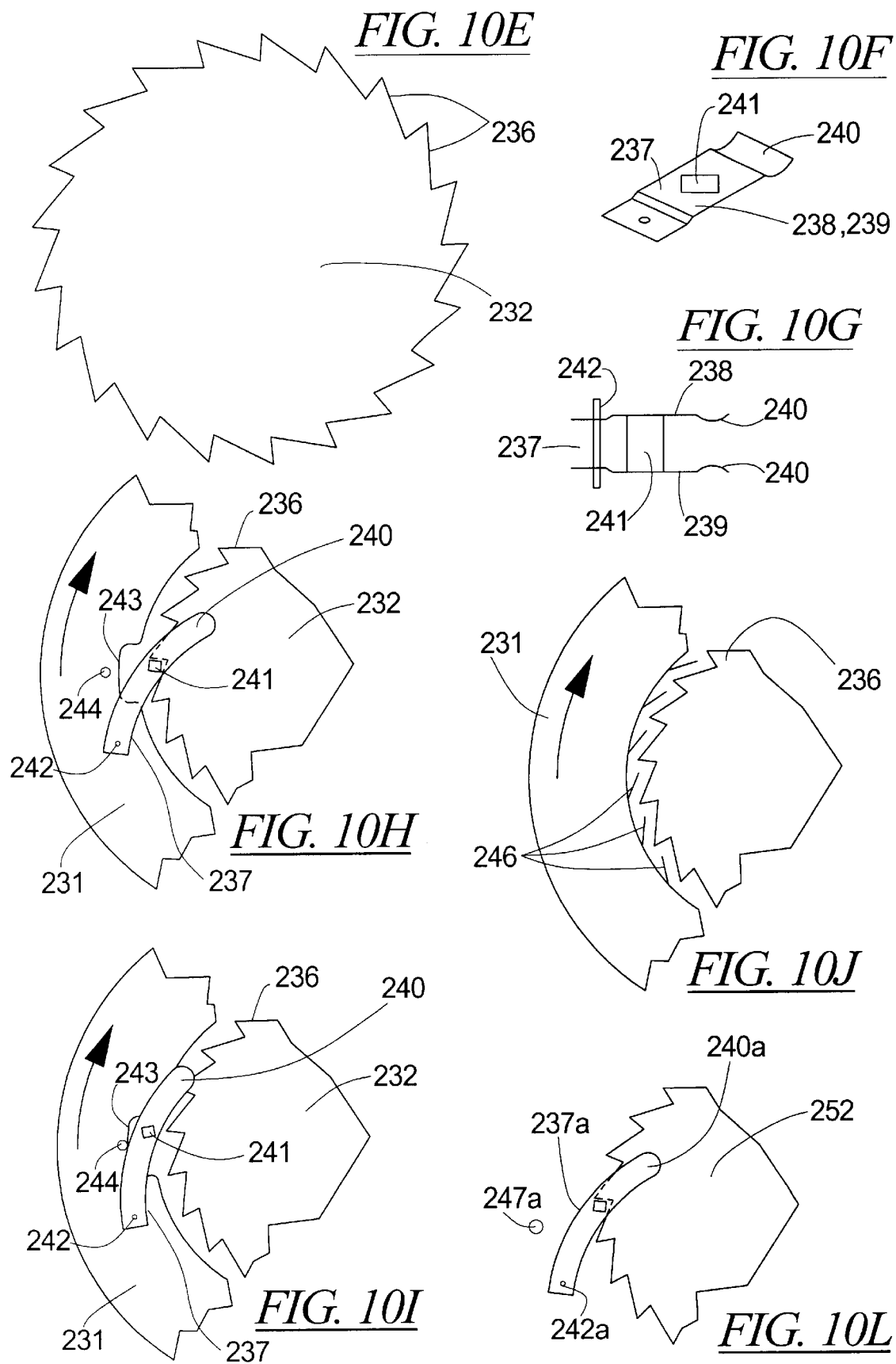

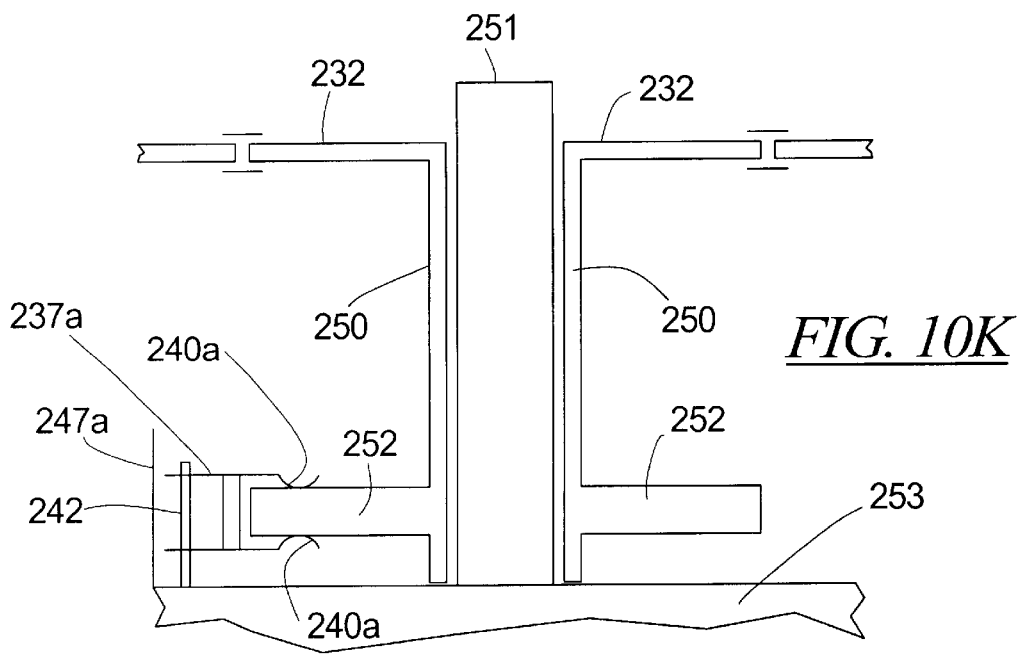
*FIG. 10K*
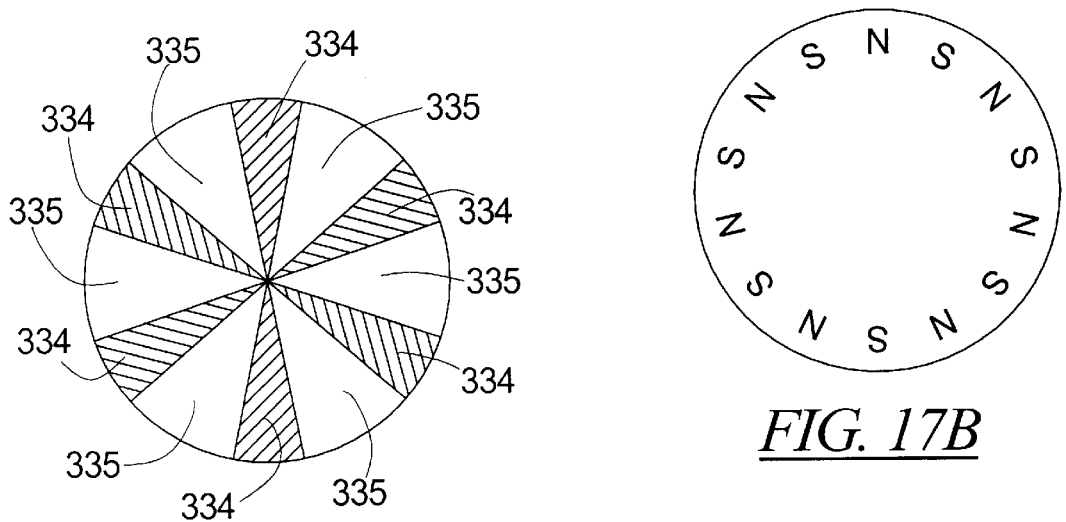
*FIG. 17A*
*FIG. 17B*
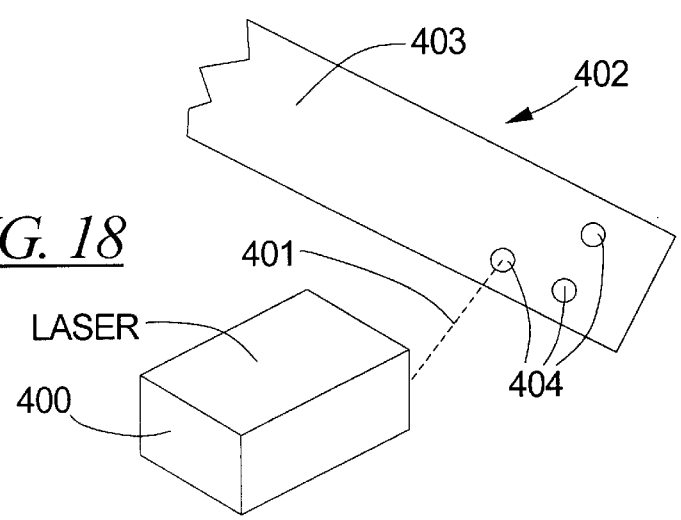
*FIG. 18*

NON-BELT DRIVE TAPE CARTRIDGE

BACKGROUND OF THE INVENTION

1. Field of the Invention

Tape is the preferred medium for long term data (information) storage (archival storage) and data backup. This is due to low cost, high reliability and high storage capacity. Over the last 10–15 years, tape cassettes and tape cartridges have taken over for the single open tape reels used previously in the professional data market. These tape cassettes and cartridges simplify the handling of the tape, provide more protection and especially in the case of the so-called 3M cartridge, make it possible to design efficient tape drives at a very low cost.

2. Description of the Prior Art

There are many types of tape cassettes, but in reality only one type of well-known tape cartridge: the 3M cartridge originally developed by the 3M Company. The main difference between the tape cassettes and the tape cartridge is in the basic construction. A cassette typically contains either one or two tape reels in a protective housing white tape guides and the whole tape driving mechanism are outside (in the drive itself. The 3M cartridge contains two tape reels as well as tape guides and part of the tape driving mechanism. The 3M cartridge is therefore a more complex design than ordinary tape cassettes, but it simplifies the design of the drive mechanism.

For data backup and archival, four types of tape cassettes and the 3M cartridge are now dominating the market: The IBM 34 80/90 single reel ½" tape cassette; the DLT single reel ½" tape cassette; the 8 mm wide (video) tape cassette; the DAT (Digital Audio Tape) tape cassette and the 3M Data Cartridge. The 3M cartridge is very often also referred to as a QIC cartridge (Quarter Inch Cartridge). The name is derived from the original tape width (¼") utilized in these cartridges.

For a long time, the QIC cartridge has been available in two sizes: The Standard cartridge suitable for use in tape drives having a 5¼" form factor, and a small cartridge, the Minicartridge, suitable for use in drives having a 3½" form factor. The basic design oft cartridges is the same. FIG. 1 shows the basic design principles.

Some small details, which are not important for the invention described later, have been omitted.

The cartridge is built up on a solid baseplate of aluminum 100. All the necessary guiding pins and tape guides are mounted on this baseplate, as are the spindles for the two tape reels and the belt roller wheel. A plastic housing 101 is mounted on top of the baseplate and covers all the moving parts inside the cartridge.

The tape 104 is wound upon two tape reels 102 and 103 known as tape hubs. When the tape is running, the tape is either moving from reel 102 to reel 103 or vice versa. During its movement, the tape is guided to the front of the cartridge by a series of guiding pins tape guides 107. Upon insertion in a tape drive, a portion of the front end of the cartridge 106 acts as a door and opens to expose the tape to allow for contact with the drives recording head for read and write operations. During insertion in the tape drive, the door is opened and the cartridge then moved forward with the door open to bring the drive read/write head 115 in contact with the tape. FIG. 2A shows the cartridge from the top with the read/write head 115 and the drive wheel 117 engaged to the cartridge (as required for normal tape operation).

A drive puck wheel 105 (also referred to as a drive roller or a belt capstan roller) drives the tape indirectly through a belt 108 (hence the name "belt driven cartridge"). This belt proceeds outside the shaft of the drive puck 105, touches on the outside of the two tape reels 102 and 103 and goes around two comer rollers 109. As explained later, these corner rollers 109 are designed to provide a certain friction for the belt, thereby helping to build up and control the overall tape tension when the tape is running.

To sense the beginning and end of the tape, each tape end is equipped with some physical holes 110. These holes are sensed by the tape drive utilizing light. Light 112 is emitted from a lamp or similar light source in the drive to an internal mirror 111 through the top cover 101. The minor 111 reflects the light toward the backside of the tape. If a tape hole is present, some light 113 will pass through the hole (or holes) 110 and this is again sensed by a light sensing device in the tape drive.

For this system to work, the cartridge top housing or at least the area above and in front of the mirror, must be transparent. This is the way the tape hole sensing works for the large cartridge (5¼"). For the small cartridge, the system is reversed so that the light enter from the bottom through a hole in the baseplate. The principle of tape hole detection is the same.

The cartridge also contains an element 114 to physically allow or prevent writing on the tape. The basic principle is a small device which either is rotated (as for the large cartridge) or moved in parallel with the front (as for the small cartridge), to either expose or cover an opening in the front cover. The drive may then detect if this opening is exposed or not and thereby know if writing is allowed or not.

The baseplate 100 of the cartridge contains some small slots, one on each side to facilitate locking the cartridge in the tape drive. For clarity, these slots are not shown in FIG. 1.

The tape drives operating these cartridges are all equipped with a drive capstan motor 116 having a capstan wheel 117 which engages the drive puck wheel 105 when the cartridge has been properly inserted into the drive. This is shown FIG. 2A and 2B. Typically, the tape drive capstan motor 116 is designed so that it can tilt toward the cartridge drive puck 105. Normally, a spring 118 is used to press the capstan wheel against the drive puck 105. The tape drive motor 116 drives a capstan wheel 117 which drives the drive puck 105 in the cartridge which drives the belt 108. The belt 108 then moves the tape 104 by driving both tape reels 102 and 103. The tape direction is given by the rotational direction of the tape drive motor 116. The two corner rollers 109 are designed to provide a controlled friction force when the belt 108 is running to help build up the proper tape tension. Each of these rollers 109 has a built-in friction system. Tape tension is built up as the belt 108 drives the tape 104. It is important that the two corner rollers 109 be designed with enough internal friction to ensure rapid build up the tape tension. At the same time, the friction level should ideally be kept as low as possible to lower the driving force (the force required to drive the capstan wheel 117 in either direction) and the internal heat dissipation.

The cartridge also contains two guiding pins 119 and 120 which reduces the tension variations when the tape is moved from BOT (Beginning-Of-Tape) to EOT (End-Of Tape).

Due to the way this cartridge is designed, the tape tension can be built up only while the tape 104 is running. At standstill, tension is reduced to a very low level or zero. Therefore, it is important that proper tape tension can be built up rapidly every time the tape movement is started. This is also necessary when the tape changes direction. FIG.

3A shows the typical tension variations as the tape is run from BOT (Beginning OF Tape) to EOT (End OF Tape) or vice versa. At the beginning the tape tension is almost zero. As the belt starts moving the tape, tension is built up fairly rapidly typically to a level around 2 oz. (approx. 56 grams). As the tape movement gets closer to the EOT side, tension is typically increasing as indicated in the FIG. 3A. When the tape stops it will rapidly loose tension again. The tension profile is similar when running from the EOT side of the tape to the BOT side. As already mentioned, the two guiding pins 119 and 120 help reduce the total tension variation as the tape 104 is running from BOT to EOT, or vice versa.

FIG. 3B shows a typical tape tension when the tape is started from BOT then stopped in the middle of the tape and reversed back to BOT again. In this case, tension first builds up as shown in FIG. 3A. When the tape 104 is then stopped, it will immediately lose tension, so that the tension is very low when the reverse movement is started. Tension is then built up as shown. As the tape 104 gets back to BOT the tension is typically increasing above the average level as shown in FIG. 3B.

As can be seen from these figures, it takes some time for the tension to be built up every time the tape starts moving, or changes direction. Good tape tension is very critical in order to achieve a stable head-to-tape interface. For the typical tape drive designed for these cartridges, a tape tension of at least 1.4 oz. is required and it should ideally be between 2 and 3 oz. However, a high tape tension also normally means that the force to drive the cartridge (turning the cartridge drive puck wheel 105) must be higher, which again means that the drive and the cartridge require more power to operate. This power is partly dissipated in the motor 116, partly in the cartridge itself. Therefore, the interior of the cartridge and the cartridge components like the baseplate may get very hot during operations, especially at high tape speeds. This in turn may cause operational problems with the belt or the tape, or at least reduce the life time of the cartridge. Additionally, the heat dissipated in the cartridge requires the baseplate 100 to be made of metal in order to act as an effective heat sink. Still, even with such heat sinks, the base 100 can get very hot during operation, especially for the small Minicartridge.

As already mentioned, keeping proper tape tension when the tape is running is extremely important in order to ensure a good contact between the tape and the read/write head (recording head) in the drive. As new advanced tape drive systems are being developed, the linear bit density and the number of tracks is constantly increased. This makes head-to-tape contact more and more critical, which means that tape tension becomes more and more critical as well.

To ensure proper tape tension and tape movement, the interface between the driving belt 108 and the tape 104 is very critical. This is true both for the front side (magnetic media side) and the backside of the tape 104. If the belt surface 108 and the front side of the tape 104 are too smooth, the belt 108 is not able to run the tape 104 properly, especially at high speed and during fast accelerations/retardations, creating tape slippage and reduced tension. However, at the same time it is necessary to make the magnetic surface of the tape very smooth in order to ensure good head-to-tape contact and reliable read/write operations. Therefore, with a smooth tape front surface, the properties of the belt surface are extremely critical. It must be designed to ensure a reliable contact between the magnetic side of the tape surface and the belt during all normal operations and within the whole range of temperatures and humidity which the cartridge is designed to meet.

The design of the known cartridge is such that the belt 108 has to be designed narrower than the tape itself. The narrower the belt, the higher friction force (equal to tape tension) is required to ensure proper tape movement. However, the narrow high tension belt will leave a depression into the tape surface, creating problems with reading and writing the data on the tape 104 over time. This becomes especially important at very high track densities (high number of tracks), because each track is so narrow that even small irregularities may cause hard write or read errors.

The backside of the tape 104 is also very critical, it must be rough enough to ensure proper packing of the tape including air drain (escape) as the tape 104 is wound on to the tape reel. Since the tape reels 102 and 103 are actually driven by the belt 108 by pushing on the outside layer of the tape 104, it is very important that the backside is rough enough to ensure stable packing of the tape 104. If the backside of the tape 104 is too smooth, the tape 104 may be wound unevenly on the reel hub. This will very often result in tape jamming, as the tape 104 falls off the reel hubs 102 and 103, especially during fast acceleration and retardation and also during storage.

However, making the backside of the tape 104 too rough is also a problem, because the roughness of the backside to some extent will penetrate to the magnetic front side of the tape ("print through"). This will cause bad head to tape contacts and a large number of read and write errors. This print through problem increases as the manufacturer introduces thinner media to increase the total tape length. Therefore, with today's design of this tape cartridge, the manufacturers must balance the roughness of the back-coating, the belt properties and the thickness of the media to find the optimum compromise. Very often, the cartridge designer is forced to reduce the maximum speed or avoid very thin tape in order to find acceptable compromises. Hence, although high data transfer rate is also desired, some of the new data cartridges now introduced have a lower maximum speed limit that the older cartridge designs.

Another problem area with the current design is the use of the corner rollers 109 with their built-in friction force. As already mentioned, this friction force is required to build up the proper tension in the tape. These two friction areas exist in addition to three other major friction areas in the cartridge. The bearing between the cartridge drive puck wheel 105 and its internal axle (or spindle), and the bearings for the two tape reels 102 and 103. Additionally, extra friction is generated wherever the tape touches guiding pins or tape guides and in the interface between the belt 108 and the backside of the tape 104 and between the tape 104 and the head.

To overcome all this friction requires a lot of driving power. Typically as much as 7 watts are constantly being used to drive a Standard cartridge, and only slightly less with the Minicartridge. This generates heat which to a large extent dissipates inside the cartridge. As already mentioned, the interior of the cartridge and the cartridge components like the baseplate can be very hot, especially at high tape speeds and high external temperatures.

Without changing the basic principle of the cartridge as described above, several other tape cartridges have been introduced during the last years, however, all of them are based upon the basic principle of the 3M cartridge shown in FIG. 1. Sony has for some years offered a version with the trade name "Pegasus". FIG. 4 shows the basic form of this cartridge. The dotted lines show the position of the two tape reels and the internal tape path. Basically, it can be viewed as a cartridge having a front compatible with a Minicartridge so it fits 3½" drive while the main portion of the cartridge is similar to a 5¼" cartridge (and thus remains outside the 3½" drive). The main reason for producing the Pegasus cartridge is that it can contain far more tape than a minicartridge. The penalty is that most of the cartridge has to remain outside the tape drive all the time. The internal design principle in the Pegasus cartridge is the same as in the other two QIC cartridges.

Originally, the two types of QIC cartridges and the Pegasus cartridge contained tape which was ¼" wide (hence the name QIC=Quarter Inch Cartridge). In 1992/93 Sony introduced another type of minicartridge with a wider tape; although the cartridge from the outside had the same dimensions as the original minicartridge. The wide tape minicartridge uses 8 mm wide tape to increase available tape area with approximately 27%. In principle, all available QIC cartridge types can be designed to use 8 mm wide tape without changing the outside cartridge dimensions.

Late 1994 and early 1995 two new versions of the QIC minicartridge were introduced to the market, both with the goal of increasing the available tape length further. The company 3M introduced a cartridge with the trade name "Travan". The basic design is shown in FIG. 5. The front of The Travan cartridge is the same as the Minicartridge, but the sides slope outwardly and the cartridges is deeper than a Minicartridge. Again, the doted lines show the approximate position of the tape reels and the internal tape path. This design allows for almost 100% more tape than in a comparable Minicartridge, while the size is such that the cartridge still can fit inside a 3½" tape drive. The basic internal design of the Travan cartridge including the way it operates is identical to the Minicartridge and the Standard cartridge.

The other new cartridge was introduced in February 1995 by the companies Gigatek and Verbatim and named EX cartridge. This cartridge has the same width as the Minicartridge but is about twice as long (deep). The two internal tape reels are not mounted side by side, but offset so that one is farther from the front end of the cartridge than the other one. This allows for more tape on both reels. Actually, this cartridge contains 33% more tape than Travan cartridge. Except for the offsetting of the tape reels, the internal basic construction and operating principle is the same as for the normal Minicartridge. Since this cartridge has the same width and height as the normal Minicartridge it will fit into the opening of a standard 3½" drive.

While it is possible to develop tape cartridges with radically different designs to overcome some of the problems mentioned above, such cartridges would also require new tape drive designs. Given the extremely high number of installed tape drives based upon the use of QIC cartridges (estimated to be more than 12 million drives by end of 1997), it is highly desirable to design a tape cartridge which overcomes or reduces some of the most critical problems with the current cartridge type, while still being compatible with the current cartridge and therefore being usable in the drives designed for these cartridges.

SUMMARY OF THE INVENTION

An object of the present invention is to provide a cartridge which operates from the outside like today's conventional belt-driven QIC cartridges and requires no changes to the tape drive design, but without the problems due to the belt touching the tape surface, and the problems related to the properties of the surfaces of the belt and the tape.

The above object is achieved in accordance with the principles of the present invention in a cartridge wherein the tape movement is controlled directly by the cartridge drive puck wheel. This is in contrast to conventional cartridges of the type described above wherein tape movement is controlled by an internal belt. The cartridge constructed in accordance with the principles of the present invention has a tape wound on reels in a housing, with the tape being in contact with the inner side of a lower portion of the cartridge drive puck wheel, with a spring loaded or deformable roller wheel pressing the tape toward to the puck shaft. Rotating the cartridge drive puck wheel moves the tape in a first direction, and rotating the cartridge drive puck wheel in the opposite direction changes the direction of the tape movement. The operation is therefore the same as for the conventional QIC cartridge.

The present invention is also directed to a method for producing light transmissive areas in a magnetic tape, which can be used in the same manner as physical holes which are conventionally made in the tape, such as to produce a hole pattern indicating the beginning of tape (BOT) and end of tape (EOT). In accordance with the inventive method, a precise laser is employed to burn away the magnetic oxide film on the plastic (mylar®) tape, but the laser beam is not sufficiently strong to burn through the plastic tape. The areas at which the magnetic film has been burned away are therefore transparent (light-transmissive), and these light transmissive areas can be made in the same pattern as conventional holes, to provide the same type of indication as the tape is transported.

DESCRIPTION OF THE DRAWINGS

FIG. 1A is a plan view of a conventional QIC cartridge, as discussed above.

FIG. 1B is a side view of a portion of the conventional QIC cartridge, showing a conventional mirror arrangement used therein, as discussed above.

FIG. 1C is a front view of the conventional QIC cartridge of FIG. 1A, as discussed above.

FIG. 2A shows the conventional QIC cartridge of FIGS. 1A–1C engaging a drive wheel and a read head in a conventional manner, as discussed above.

FIG. 2B is a side view showing engagement of the drive wheel with the conventional cartridge of FIG. 2A, as discussed above.

FIG. 6B shows a section through the middle of a cartridge constructed in accordance with the principles of the present invention.

FIG. 6C shows a section along the front of a cartridge constructed in accordance with the principles of the present invention, through the center of the drive puck and the tape guides.

FIG. 7A is a side view showing details of the mounting of the roller wheel in a cartridge constructed and operating in accordance with the principles of the present invention.

FIG. 7B is a plan view of the arrangement shown in FIG. 7A.

FIG. 7C is a plan view of a further embodiment for the engagement of the roller wheel in a cartridge constructed and operating in accordance with the principles of the present invention.

FIG. 8 shows the structure of the embodiment of FIGS. 7A and 7B incorporated in a complete cartridge, constructed and operating in accordance with the principles of the present invention.

FIGS. 9A and 9B explain the basics of the operation of a cartridge constructed and operating in accordance with the principles of the present invention, with the tape respectively moving in opposite directions.

FIG. 10E is a plan view, with other components removed, of the top flange of the hub assembly shown in FIG. 10B.

FIGS. 10F and 10G show details of a coupling assembly for interacting with the top flange shown in FIG. 10E and the hub assembly shown in FIG. 10B.

FIGS. 10H and 10I show in the interaction of the coupling assembly with the top flange and the outer ring in the hub assembly of FIG. 10B, for two directions of rotation, respectively.

FIG. 10J shows a further embodiment for coupling elements disposed between the outer ring and the top flange suitable for use in the hub assembly of FIG. 10B.

FIG. 10K shows the basic components of the hub assembly of FIG. 10B, with a coupling assembly disposed at the bottom flange thereof.

FIG. 10L is a detail showing the interaction of the bottom coupling assembly with the bottom flange in the hub assembly of FIG. 10K.

FIGS. 17A and 17B respectively show two embodiments of a magnetic disk suitable for use in the magnetic coupling embodiment of FIGS. 16A and 16B.

FIG. 18 schematically illustrates a method for producing a pattern of light transmissive areas on a magnetic tape in accordance with the principles of the present invention.

DESCRIPTION OF THE PREFERRED EMBODIMENTS

Figure 3A:
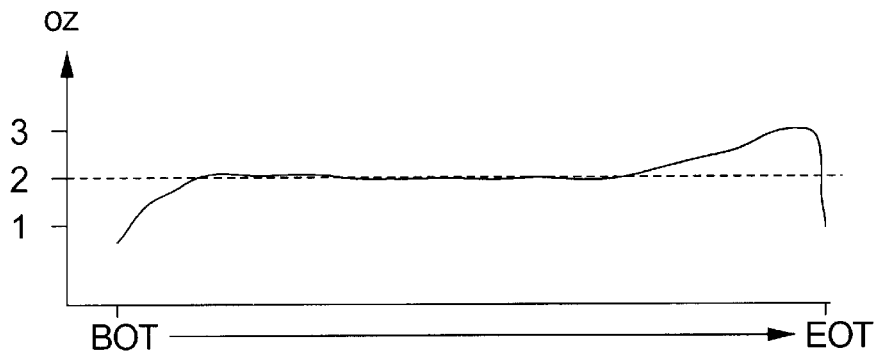
FIG. 3A is a graph showing typical tension variations which occur in a conventional QIC cartridge as the tape proceeds from BOT to EOT, or vice versa, as discussed above.
Figure 3B:
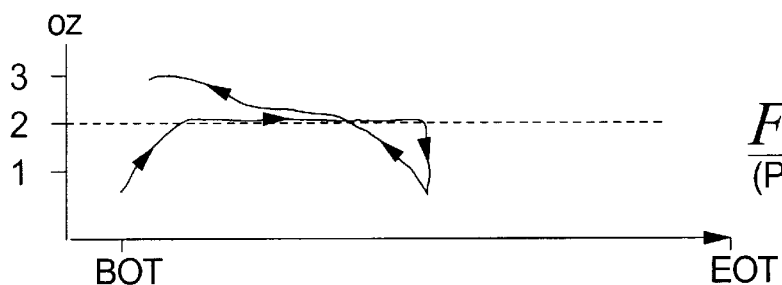
FIG. 3B shows a typical tape tension of a conventional QIC cartridge when the tape is started from BOT, stopped in the middle of the tape, and reversed back to BOT, as discussed above.
Figure 4:
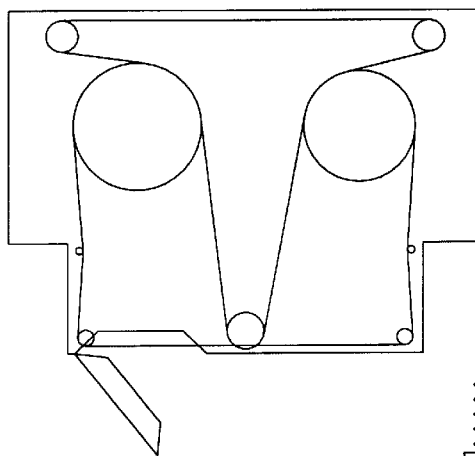
FIG. 4 is a plan view of a further commercially available version of the known QIC cartridge, as discussed above.
Figure 5:
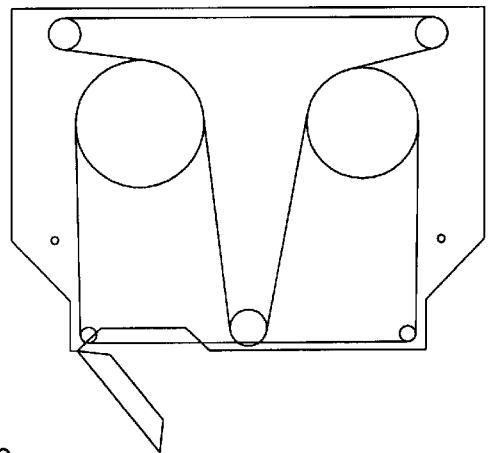
FIG. 5 is a plan view of another commercially available version of the known QIC cartridge, as discussed above.
Figure 6A:
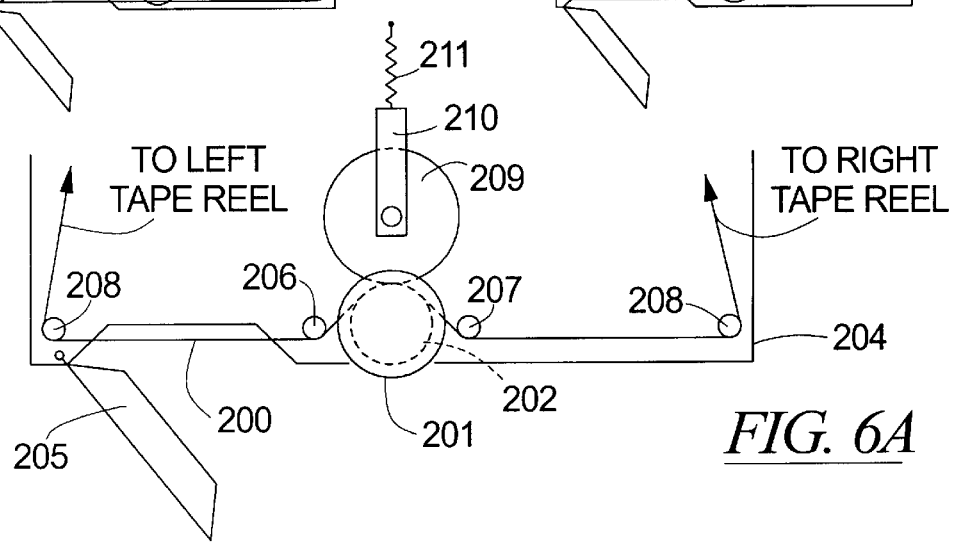
FIG. 6A is a plan view of a portion of a cartridge constructed and operating in accordance with the principles of the present invention.

FIGS. 6A, 6B and 6C show the basic structure of the invention with respect to the task of moving a tape 200. Only the front end of the cartridge is shown in those figures. The key principle of the invention is that the tape movement shall no longer be controlled (or driven) by an internal belt, but directly by the cartridge drive puck wheel 201. This is accomplished, by guiding the tape 200 to the inside side of the lower portion 202 of the cartridge drive puck wheel 201 (referred to as the puck shaft 202), and having a spring loaded or flexible roller wheel 209 pressing the tape 200 towards the puck shaft 202. Spring 211 produces this pressure. Rotating the cartridge drive puck wheel 201 clockwise will move the tape from the left to the right. Rotating the cartridge drive puck wheel 201 in the opposite direction will change the tape direction from right to left. This is therefore the same as for the normal QIC cartridge.

To ensure proper tape guiding around the puck shaft 202, tape guides 206 and 207 are placed on each side of the drive puck 201. Two tape guides 208 control the rest of the tape path in the front of the cartridge.

FIG. 6A shows the basic driving principle seen from above, assuming the top cover is removed for clarity. FIG. 6B shows a section through the middle of the cartridge (through the centers of the drive puck wheel 201 and the roller wheel 209). The tape is pressed between the puck shaft 202 and the roller wheel 209. Therefore, when the drive puck 201 rotates, the tape 200 is forced to move.

FIG. 6C shows a section alongside the front of the cartridge through the center of the drive puck 201 and the tape guides 206 and 207.

To ensure compatibility between the conventional 3M cartridge design and cartridges based upon this invention, the ratio between the rotating speed of the cartridge drive puck 201 (when the cartridge is inserted in a tape drive and running) and the corresponding speed of the tape 200 must be the same. This is controlled by the diameter of the puck shaft 202 (assuming That the diameter of the cartridge drive puck wheel 201 itself is not changed). Here the Standard 3M cartridge and the Minicartridge (including the Travan cartridge) differ. For the standard 3M cartridge, the specification (as defined in QIC document QIC-163 rev. C dated Mar. 4, 1993) states that one turn of the capstan roller wheel shall move the tape 54.7 mm (2.15 inches). Similar, QIC document QIC-139 Rev. A dated Mar. 15, 1995 specifies that for the Minicartridge (and for the similar "Pegasus", the "Travan" and the "LX" cartridges), one complete rotation of the drive puck wheel 201 shall move the tape 38.3 mm (1.51 inches).

Therefore, a cartridge based upon the invention and having the same form factor as the Standard cartridge needs to have a diameter of the cartridge drive puck shaft 202 given by:

$$54.7 = 2\pi R$$

where R (in mm) is the radius of the capstan roller shaft driving the tape. This gives R=8.70 mm equivalent to 0.34 inches.

The radius of the cartridge drive puck wheel is 11.30 mm or 0.445 inches for the Standard cartridge. The radius of the lower portion of this wheel (the puck shaft 202, where the belt touches conventionally and where the tape will touch in the invention described herein) is typically 8.5 to 8.6 mm. Therefore, the requirement for the radius of the puck shaft is 2.65 mm (0.104 inches) less than the radius of the cartridge drive puck wheel, and very close to the current radius of the puck shaft used conventionally, making enough room for the cartridge housing outside the puck shaft 202. This is important to avoid dust and fingerprints being transferred too easily onto this shaft (and thereby on to the tape).

The small cartridge (Minicartridge) will likewise require a driving shaft with a radius "r" given by the equation $$38.3 = 2\pi r$$

which gives $$r = 6.10 \text{ mm equivalent to } 0.24 \text{ inches.}$$

This fits well with the current designs for the Minicartridge (including Travan, Pegasus and LX cartridges). The Minicartridge has a drive puck wheel with a radius of 7.92 mm (0.31 inches). Therefore, the shaft radius calculated above will fit well with the dimensions of the Minicartridge drive puck.

As already mentioned, the roller 209 pressing the tape 200 toward the puck shaft 202 either needs to be spring-loaded or made of a flexible material to ensure good contact between the tape and the capstan shaft. FIGS. 7A, 7B and 7C show two practical implementations. FIGS. 7A and 7B show the roller wheel 209 mounted on a movable arm 212. A spring 213 ensures that the roller constantly presses on the tape to ensure proper contact between the tape and the puck shaft 202. The roller wheel 209 should have a surface of rubber or similar material to ensure an evenly distributed pressure over the whole tape width. FIG. 7C shows the roller being made of very flexible material such as soft rubber to avoid the use of a spring-loaded roller. In this case the roller material and the mounting of the roller are more critical than the version shown in FIGS. 7A and 7B, but the design is simpler and less costly.

It should be noted that compared with the conventional 3M belt driven cartridge design, the roller 209 can be designed to cover (i.e., be co-extensive with) the whole tape width, thereby reducing the problems related to the belt touching only a portion of the tape width. Additionally, since the roller 209 has no other function than ensuring an even pressure on the tape 200, it can be optimized for this purpose only. Additionally, since the driving force now is between the drive puck shaft 202 and the whole width of the tape 200 (and not approximately half the width as for the 3M cartridge design), and the roller 209 easily can be designed to have significantly higher pressure than is possible with the conventional belt design, the front side (magnetic surface) of the tape 200 and the drive puck shaft 202 both can be designed with very smooth surface without the usual driving property problems. As already described a smooth tape surface ensures good head-to-tape contact. A smooth surface of the front side of the tape 200 and the drive puck shaft 202 also minimizes the risk of debris accumulating on the tape 200 itself or on the drive puck shaft 202.

It is also important to note that with a suitable design, the roller wheel 209 will press on the drive puck shaft 202 at exactly 180 degrees opposite to the side from which the drive capstan motor presses on the drive puck wheel. For a Standard cartridge, the specification calls for nominal 5N (1 Lb.) force between the tape drive capstan wheel and the cartridge drive puck. (The corresponding number for the Minicartridge is 4.05 N (nominal value)). With these two forces both pressing on the drive puck wheel and shaft at 180 degrees, these forces to a certain degree will balance each other, reducing the effective force on the drive puck and its internal spindle (axle). Heat dissipation at the baseplate in the vicinity of the drive puck spindle is therefore reduced. There will of course be some heat dissipated around the drive roller and its spindle. However, this design will help distribute the dissipated heat on a larger baseplate surface than in the conventional 3M cartridge design. In the conventional 3M cartridge design, the baseplate area around the drive puck spindle is normally the hottest on the whole cartridge baseplate during operation. Being close to both the belt and tape area, this limits the maximum operating temperature and the lifetime of the cartridge. Reducing this maximum temperature by ensuring a better (wider) heat distribution on the baseplate and reduced net force between the drive puck and its internal spindle therefore helps increase reliably, lifetime and operating temperature.

FIG. 8 shows how the movement of the cartridge tape hubs (the two wheels containing the tape) relates to the drive of the tape produced by the embodiment of FIG. 6 (but the basic operation shown in FIG. 8 pertains to the other embodiments as well). In FIG. 8, the two hubs are referred to as 220 (the left hub) and 221 (the right hub). Rotating the cartridge drive puck wheel 201 clockwise will move the tape from left to right. Therefore, in this case the tape on the left hub 220 will unwind while tape will be wound on the right hub 221. Hence, in this case the hub 221 needs to be rotated in a counterclockwise direction (opposite the rotation of the capstan cartridge wheel). To maintain a proper tape tension, the hub 220 needs to be either friction braked or friction rotated in the clockwise direction to keep the proper tension.

Rotating the cartridge drive puck wheel 201 in the opposite direction (counterclockwise) will move the tape from right to left. In this case, tape hub 220 needs to be friction driven in the clockwise direction to keep the proper tape tension over the head area, while hub 221 needs to be either friction braked or friction driven counterclockwise in order to maintain a proper tape tension on the right side of the capstan wheel (for the hole sensor system).

Figure 9B:
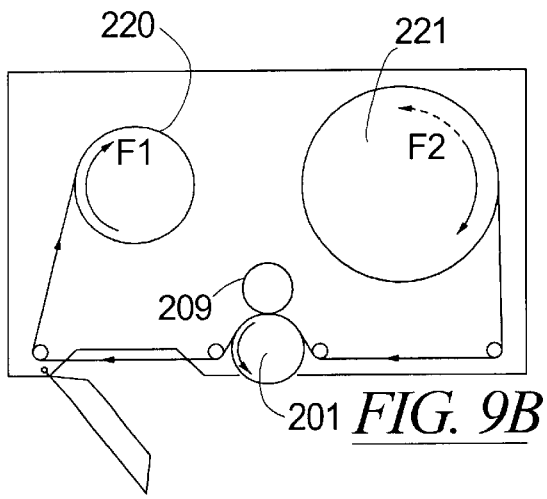

FIGS. 9A and 9B show a simplified illustration with the direction forces marked. FIG. 9A shows the operation when the cartridge drive puck wheel 201 is rotated clockwise, moving the tape from left to right. FIG. 9B shows the operation when the tape is moved in the opposite direction. Either way, the pressure from roller wheel 209 produces a force K on the tape to move from left to right or vice versa.

In FIG. 9A tape is moving off of the hub 220 onto the hub 221. The hub 220 is therefore actually rotating in a counterclockwise direction. To ensure proper tape tension, however, the hub 220 needs to introduce a force opposite to the direction of the hub rotation. This can be achieved by having the hub 220 equipped with a braking system which has a braking force $F_1$ relative to the tape movement direction. It can also be achieved by having the inner center of the hub 220 rotate in the opposite direction of the tape movement, and then having an internal friction-based coupling in the hub 220 to let the tape be dragged out from the hub 220 in the opposite direction from the inner center rotation with a dragging (tension) force $F_1$. The tension force $F_1$ must obviously be lower than the force K.

The hub 221 in FIG. 9A needs to rotate in the counterclockwise direction. This hub also need to have a system which ensures the proper tension force $F_2$ on the tape. Since the section of the tape between the roller wheel 209 and hub 221 is effectively isolated from the section between hub 220 and roller wheel 209, force $F_2$ is less critical than in the original QIC cartridge where this force directly relates to the overall tape tension. The tension force $F_2$ can be achieved by having hub 221 equipped so that the inner section rotates the same way the tape is winding (counterclockwise), but having a built-in friction coupling so that the dragging force on the tape is always $F_2$, the friction force $F_2$ needs to be less than force K.

FIG. 9B shows the opposite situation. Here roller wheel 209 rotates oppositely to the case in FIG. 9A and the tape is moving from right to left. To ensure proper tension around the opening for the head area, the hub 220 needs to rotate clockwise but must be friction driven so that it establishes a force $F_1$ on the tape, where $F_1$ needs to be lower than force K. The hub 220 must be friction driven or designed in a similar way to allow for variable rotating speed depending upon how much tape is on the hub 220 at any given time.

The hub 221 in FIG. 9B needs to establish a tension in the tape between the hub 221 and the roller wheel 209 and drive puck 201. As already mentioned, this force $F_2$ is less critical than force $F_1$ since it does not control the tension for the tape section passing over head. The hub 221 will rotate clockwise, but will have a force (generated by friction or in similar manner) which establishes a force $F_2$ in the opposite direction.

Therefore, the hub 220 will always establish a force F, on the tape in the clockwise direction regardless of the rotational direction of the hub 220 itself. Likewise, hub 221 will always establish a force $F_2$ on the tape in the counterclockwise direction, regardless of the rotational direction of the hub.

Figure 10A:
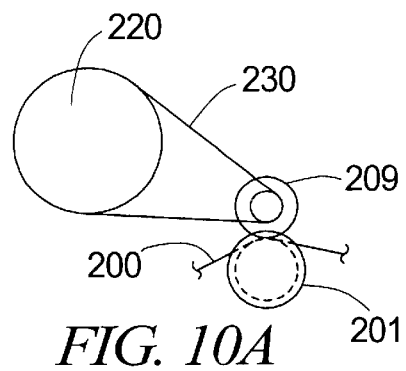
FIG. 10A is a plan view showing one embodiment of a drive connection between on of the hubs and the roller wheel, suitable for use in a cartridge constructed and operating in accordance with the principles of the present invention.

FIGS. 10A–10M show one way to establish the necessary driving force and the friction control for the hub 220. A thin wire 230 (FIG. 10A), drives the hub 220 from the center axle of the roller wheel 209. The FIG. 10A also shows the tape 200 and the capstan drive puck 201. The wire 230 is mounted so that it proceeds around the outer circumference of the hub 220 and around the center axle of roller wheel 209. Therefore, this wire 230 will drive the hub 220 in the same rotational direction as the rotational direction of roller wheel 209.

Figure 10B:
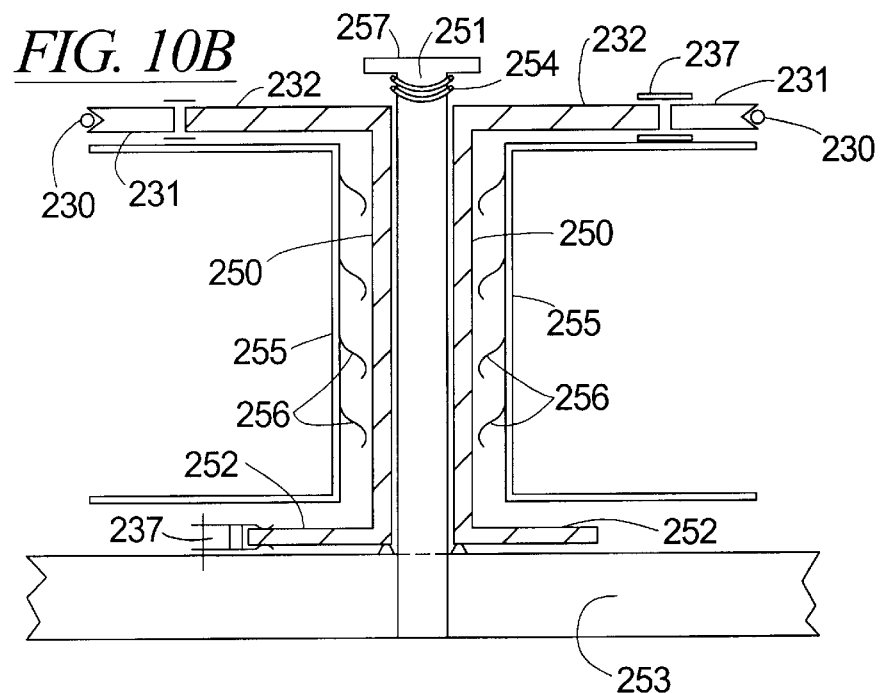
FIG. 10B is a section through one of the hub assemblies in a cartridge constructed and operating in accordance with the principles of the present invention.

The hub 220 is actually an assembly which is composed of several components. FIG. 10B shows a vertical section through the assembly of the hub 220 with some of the basic elements of this assembly. More details are shown in FIGS. 10C through 10K. On the top of the this assembly is an outer ring 231 which has a groove 233 (typically triangular in cross-section) at its exterior wherein the thin wire 230 resides. (See also FIG. 10C.) When the wire 230 rotates, it will rotate the ring 231. On the inside (inner circumference) of ring 231 is a square groove 234. The outer section of the top flange 232 of the main hub section 235 resides inside this groove 234 as shown in FIG. 10C. Therefore, ring 231 is able to rotate (glide) around top flange 232, kept in place by groove 234.

Without any other connection or coupling between the outer ring 231 and the top flange 232, the ring 231 would move freely (except for friction in the groove 234) around the flange 232 driven by any movement of the wire 230. There is, however, a connection or coupling between the ring 231 and the flange 232, as detailed in FIGS. 10D–10F. The outer edge of the top flange 232 is not smooth, but is equipped with teeth 236 as shown in FIG. 10E. The teeth 236 are designed so that they are straight on one side and beveled on the other side. The groove 234 in the outer ring 231 must be deep enough to properly keep the outer section of top flange 232 with the teeth 236 inside the groove 234, to avoid the outer ring 231 becoming disengaged from the top flange 232.

The teeth 236 allow a fixed coupling between the outer ring 231 and the top flange 232 when the wire 230 and the outer ring 231 are rotating in the clockwise direction. No coupling (except for a small amount of friction) occurs when the wire 230 and the outer ring 231 are rotating in the opposite direction. This is accomplished with one or more coupling assemblies 237, mounted on the outer ring 231 shown in a plan view in FIG. 10D. The basic design of a coupling assembly 237 is shown in FIGS. 10F and 10G. Each coupling assembly 237 has two small blades, one upper blade 238 and one lower blade 239. The blades 238 and 239 form a curve as indicated in FIG. 10F. At one end, each of these blades 238 and 239 have a small curved spring 240. The distance (lower to upper) between these two springs 240 is slightly less than the thickness of the top cover flange 232.

The two blades 238 and 239 are kept at a fixed spacing by a small block 241 which is mounted between the blades 238 and 239. At the opposite side of the springs 240 is a spindle 242. The entirety of each coupling assembly 237 is mounted on the inner side of the ring 231 so that the blade 238 is on one side (the upper) of the ring 231 and the other blade 239 is on the other side of the ring 231. The spindle or pin 242 is mounted through a hole in the ring 231 so that the entire coupling assembly 237 can easily rotate a (limited) distance around the spindle 242.

FIGS. 10H and 10I show how each coupling assembly 237 is mounted on ring 231 and how it operates.

FIG. 10H shows a situation where the wire 230 rotates outer ring 231 in the clockwise direction. The spring portions 240 of the blades 238 and 239 reside on each side of the top flange 232. The outer end of these two springs 240 press lightly onto the surface of the top flange 232.

When outer ring 23 starts to rotate clockwise (driven by the wire 230), the coupling assembly 237 has to follow since the spindle 242 goes through this outer ring 231. The top flange 232 will not start moving immediately, however, and since the two spring ends 240 press onto the surface of the top flange 232, each coupling assembly 237 will start to rotate inwardly around spindle 242. This rotation will stop when the block 241 between the two blades 238 and 239 hits one of the teeth 236 on the outer edge of top flange 232. Thereafter, the top flange 232 will rotate with the same rotational speed and in the same direction as the outer ring 231 as long as the ring 231 rotates clockwise. Each coupling assembly 237 therefore assures a solid, stable connection between the outer ring 231 and the top flange 232 when the rotation is clockwise. (Although not required to describe the operation at this point, it should be noted that top flange 232 is made so that it never can rotate counterclockwise. This will be described later.)

FIG. 10I shows the opposite situation, where the wire 230 and thereby the outer ring 231 rotate counterclockwise.

Again, each coupling assembly 237 must follow the rotation of the outer ring 231, since it is linked to this ring by the spindle 242. As already mentioned, the top flange 232 cannot rotate counterclockwise. With the two spring ends 240 pressing on each side of the top flange 240, the whole assembly 237 will swing outwardly. The slope of each tooth will also help to force each coupling assembly 237 to swing outwardly (around spindle 242).

As shown in FIGS. 10H and 10I, the inner section of ring 231 has a recess 243 just where the block 241 hits when the assembly 237 swings outwardly. Therefore, the block 241 is allowed to swing away from the teeth 236 on the outer side of top flange 232. The two spring ends 240 still reside on each side of the top flange 232, but as already mentioned, this friction force is fairly low. Therefore, the wire 230 can easily move the outer ring 231 counterclockwise, while the top flange 232 remains stable (non-rotating). The outward rotation of each coupling assembly 237 is either stopped by a small stop pin 244 or when the block 241 bits the wall of the recess 243.

Although each coupling assembly 237 can be made from many small parts, it is also possible to mold the whole assembly (except for the spindle 242) as one piece (for example of a suitable plastic material).

Figure 10D:
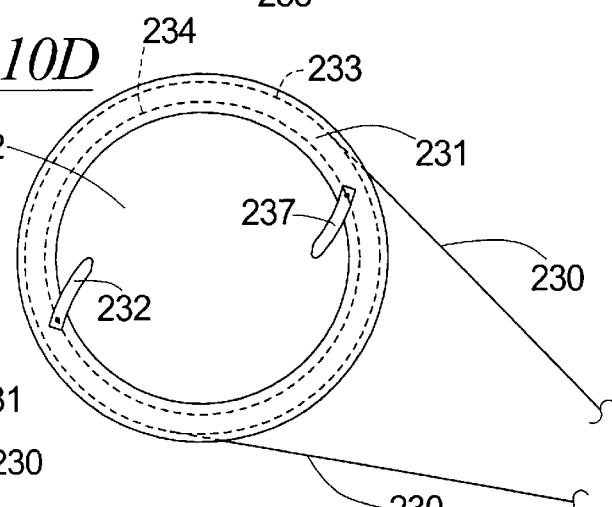
FIG. 10D is an enlarged plan view of the hub assembly of FIG. 10B.
Figure 10C:
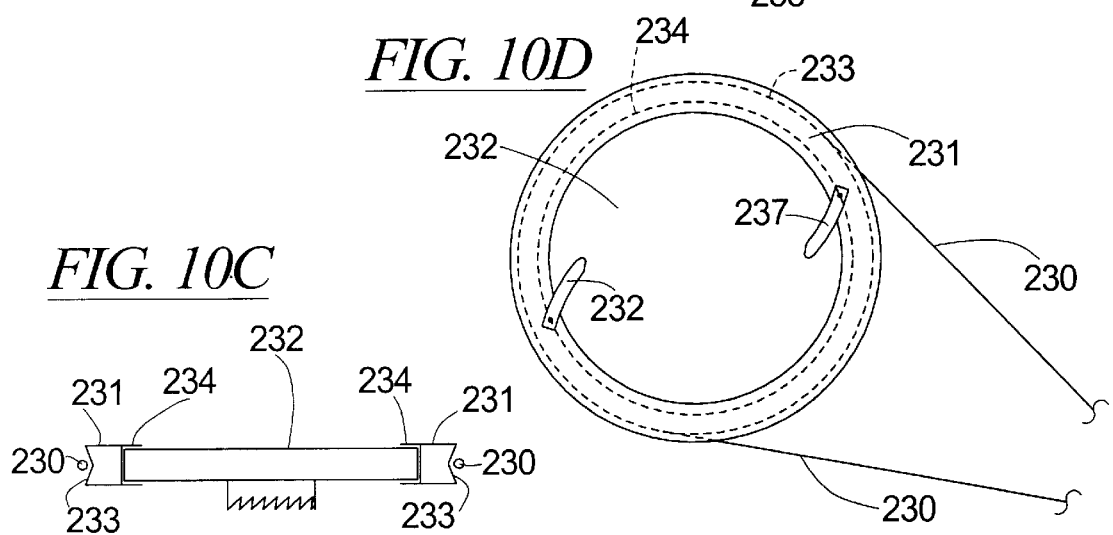
FIG. 10C shows a detail from the sectional view of FIG. 10B.

Normally, one coupling assembly 237 is enough to ensure proper operation between the outer ring 231 and top flange 232, however, as shown in FIG. 10D, it may be desirable to utilize two coupling assemblies 237 in order to produce symmetrical forces.

There are many other ways to ensure the proper connection between the outer ring 231 and the top flange 232, including the possibility of using a set of small springs 246 protruding from the inner section of the outer ring 231 as shown in FIG. 10J. When rotating clockwise, these springs 246 will engage the teeth 236 of the top flange 232 and drive this flange 232 around in the same direction, but they will just slip over the teeth 236 when rotating in the opposite direction. Such springs 246 can be molded as a part of the molding the basic core of the ring 231.

Regardless of the design principle chosen to connect or disconnect the ring 231 with the top flange 232, it is important to utilize a design which avoids irritating noise when the outer ring 231 rotates counterclockwise, and the top flange 232 stands still.

As shown in FIG. 10B, the top flange 232 is a part of the molded hub body 250. This hub body 250 rotates around a hub spindle 251. The bottom flange 252 of hub body 250 is also equipped with teeth in the same way and design as shown for the top flange (FIG. 10E). A coupling assembly 237a of the same design as the coupling assembly 237 shown in FIGS. 10F and 10G is mounted so that it engages around the outer section of the bottom flange 252 in the same way as shown in FIGS. 10H and 10I for the top flange 232. This is shown in FIGS. 10K and 10L. As shown in FIG. 10K, however, the coupling assembly 237a is mounted so that its spindle 242a is fixed to the cartridge baseplate 253. This will ensure that the total hub body 250 with the bottom flange 252 and the top flange 232 can rotate easily around the hub spindle 251 clockwise, but it will be prevented from rotating in the opposite direction. A pin 247 prevents the assembly 237a in FIGS. 10K and 10L from swinging too far away from the outer section of bottom flange 252. The spring edges 240a of the assembly 237a in FIGS. 10K and 10L will always reside on each side of the bottom flange 252.

As already mentioned during the description of the top flange 232, the stop system shown in FIGS. 10K and 10L may be designed in many different ways, including using a set of small springs in a similar way as described in FIG. 10J for the top flange 232. Again, it is important that the design chosen is reliable, simple and with low audible noise during operation.

Reverting to FIG. 10B which shows a vertical section through hub assembly 220 with the key elements as earlier described, the hub body 250 is mounted so that it can rotate around hub spindle 251. The spindle 251 is mounted on the cartridge baseplate 253. The top of the spindle 251 has a flange 257 and a spring 254 to keep hub body 250 in a stable position relative to the baseplate 253. Normally, there will be some form of glider rings between the baseplate 253 and the hub body 250 and between the top spring 254 and the hub body 250 to reduce friction and audible noise when the hub is rotating. For clarity reasons this is not shown in FIG. 10B.

As already described, hub body 250 has a top flange 232 and a bottom flange 252. Gliding around the outer section of the top flange 232 is the outer ring 231 as already described in FIGS. 10C through 10M. One or more coupling assemblies 237 ensures proper coupling between the outer ring 231 and the top flange 232. The wire 230 drives the outer ring 231.

Furthermore, the bottom flange 252 of the hub spindle 250 also has a coupling assembly 237a as discussed in connection with FIGS. 10K and 10L. This coupling assembly 237a prevents the hub body 250 from rotating in a counterclockwise direction, while the hub body 250 with its flanges can freely (with very little friction force) rotate clockwise.

Figure 10M:
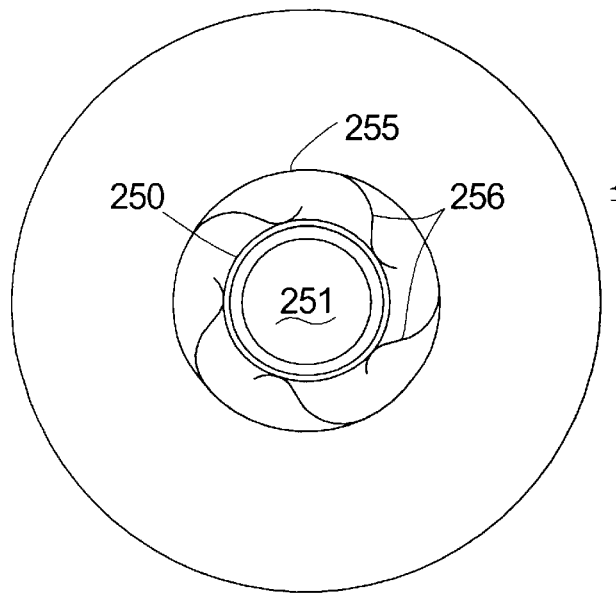
FIG. 10M is a section taken through the hub assembly of FIG. 10B, perpendicular to the rotational axis.

Mounted onto the hub body 250 is the tape reel 255 on which the tape is wound or unwound. This tape reel 255 is connected to the hub body 250 by a friction coupling. FIG. 10B shows this as a set of springs 236 extending from the inner bore of the tape reel 255 and pressing onto the outer section of the main hub body 250. FIG. 10M shows this as seen in a horizontal section through the tape reel 255 and the hub body 250. The springs 256 are designed to press evenly around the hub body 250. With proper design, the friction force between the tape reel 255 and the hub body 250 can be equal to the force $F_1$ defined in FIG. 9 required for braking or winding the tape.

Such a friction coupling can be designed in many other ways, including the use of pressure pads or tubes between the inner section of the tape reel 255 and the outer section of the hub body 250. There are also many other ways of designing friction couplings using, for example, combinations of pressure pads and springs, etc. The important point is that the coupling is designing to allow the tape reel 255 to rotate with the hub body 250 until it is stopped with a force equal to or greater than $F_1$.

With reference to FIGS. 9A and 9B and FIGS. 10A–10M, the operation of the left hub assembly 220 is as follows:

When the tape is moving from left to right, it is unwinding from the hub assembly 220 (see FIG. 9A). The pressure roller 209 will now rotate counterclockwise and this also will rotate the outer ring 231 of the hub assembly 220 counterclockwise. As already described, the hub body 250 is prevented from rotating in the counterclockwise direction by the coupling assembly 237 connected to the bottom flange 252 of the hub body. Therefore, hub body 250 with its flanges 232 and 252 stands still. The coupling assembly 237 coupled between the outer ring 231 and the top flange 232 will just glide outwardly as described earlier to allow the outer ring 231 to rotate freely.

The drive puck 201 is rotating clockwise, driven by the capstan motor in the tape drive. The tape 200 is therefore driven from hub 220 onto hub 221. Since the hub body 250 of hub assembly is standing still, the tape reel 255 of hub assembly 229 is forced to rotate around hub body 250. The force to rotate the tape reel 255 is equal to the friction force $F_1$ between the tape reel 255 and the hub body 250. This ensures a stable tape tension when the tape is moving from the hub 220 to the hub 221 (the operation of the hub 221 being described below).

When the tape is moving from right to left (see FIG. 9B), it will unwind from the hub 221 and wind onto the hub 220. In this case, drive puck 201 is rotating counterclockwise and the pressure wheel 209 is rotating clockwise. This means that the wire 230 will rotate in the same direction and this will again drive the outer ring 231 of the hub 220 in the same direction (clockwise). As already described in the FIGS. 10A through 10M, when the outer ring 231 rotates clockwise, it will through the coupling assembly 237 (ref. FIGS. 10F through 10J) engage the top flange 232 of the hub body 250 to rotate in the same direction and with the same rotational speed. The tape reel 255 is therefore, through the friction coupling with the hub body 250, also rotating in the same direction and therefore winding the tape. The rotational speed of the hub body 250 will always be higher (discussed in more detail below) than the necessary rotational speed of the tape reel 255. Therefore, the tape reel 255 is slipping with respect to the hub body 250 and the slipping force is equal to the force $F_1$. Therefore, the tension in the tape will be equal to force $F_1$.

Therefore, this design has made it possible to operate the hub 220 in accordance with the requirements given by FIGS. 9A and 9B.

The hub assembly 221 will be designed in the same way as already described for hub assembly 220 in FIGS. 10A through 10M. The only difference is that the rotational directions (when the hub is moving and when it is stopped) will be just the opposite of those used for hub 220 and thus all the components of hub assembly 222 must be designed accordingly. The hub 221 will be driven by a wire from the roller 209 to its outer ring in the same way as described for hub assembly 220.

The friction force $F_2$ of hub assembly 221 will be set to ensure proper winding and unwinding. It must, as already mentioned, be less than the force K generated by the movement of the drive puck 201.

As already mentioned, the rotational speed of the hub body 250 (when winding) must be higher than the rotational speed required for the tape reel 255. This is necessary to ensure proper winding and to be sure that the friction coupling between the tape reel and the hub body is slipping correctly.

To allow for maximum tape length inside the cartridge, however, it is desirable to make the diameter of the innermost part of the tape reel as small as possible. This will introduce a problem when tape is initially wound on such a reel, because the rotational speed of the hub body 250 (and therefore also the maximum rotational speed of the tape reel 255) may be lower than the tape reel speed required to wind the tape. (As more tape is wound on the reel 255, this problem disappears, because the necessary rotational speed is reduced below the speed of the hub body 250).

Figure 11:
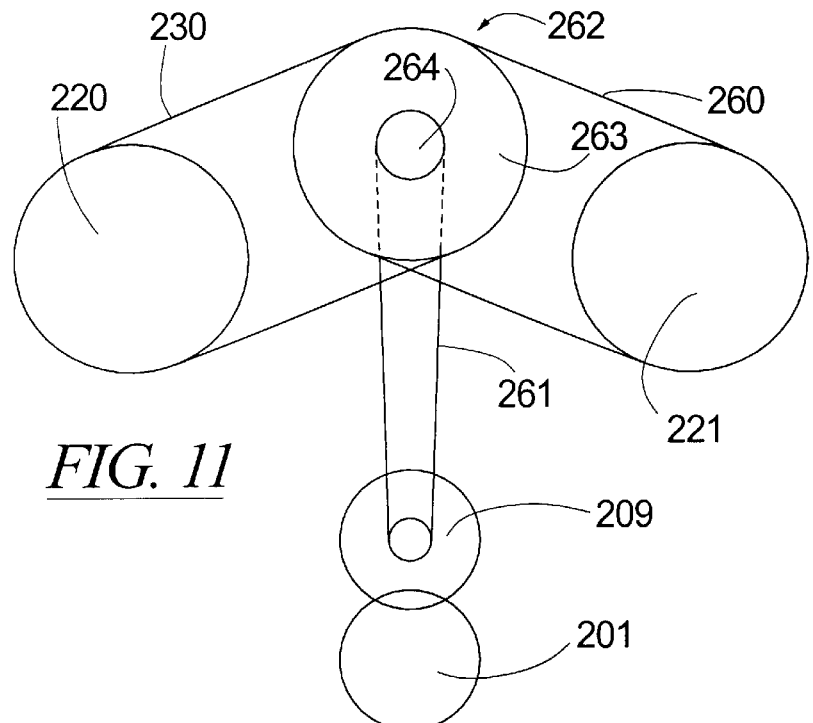
FIG. 11 shows an embodiment for driving two hubs in a cartridge constructed and operating in accordance with the principles of the present invention.

To ensure proper winding of the tape into the tape reel 255 when there is little or no tape on the reel 255, a system for gearing up the rotational speed of the hub assembly is required. One method is shown in FIG. 11. Instead of connecting the driving wires 230 and 260 directly from roller wheel 209 to the respective hubs 220 and 221, these two wires 230 and 260 are entrained around the circumference of a larger wheel 263 of a double wheel 262. The smaller wheel 264 of this double wheel 262 is driven by a wire 261 from the roller wheel 209. In this way, the rotational speed of the hub bodies will increase to insure that the tape reel is rotating at the correct speed even at the beginning of the winding operation.

FIGS. 10A–10M and 11 show one basic method to operate the hub assemblies according to the requirements given in FIGS. 9A and 9B. There are many other methods which may be used, including the use of toothed wheels (gear wheels) instead of driving wires. Such geared wheels can be coupled and uncoupled to the hub assemblies in several different ways. The basic operation and requirements of the hub assemblies, however, remain the same.

The invention described thus far is a cartridge which is fully compatible with existing 3M belt driven data cartridges, without any changes required to the tape drive design. Although the basic idea described in FIGS. 6A, 6B and 6C is very simple, the design and operation of the hub assemblies as described in FIGS. 10A–10M and 11 are somewhat more complicated in order to avoid any changes to the tape drives. Based on the same idea described in FIGS. 6A, 6B and 6C, it is also possible to design a cartridge which has a much simpler design and operation of the hub assemblies. Such a cartridge will require changes to the basic tape drive design, but since such a cartridge will still utilize the basic tape movement design described in FIGS. 6A–6C, it will be fairly simple to design a tape drive which can utilize both the conventional belt driven cartridges and these new cartridges.

Figure 12A:
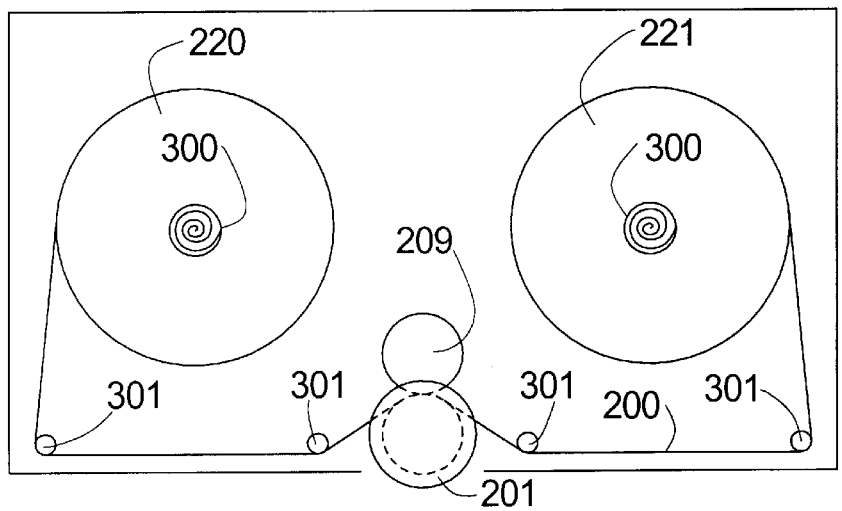
FIGS. 12A and 12B show a further embodiment, in plan view and front view, respectively, of a cartridge constructed in accordance with the principles of the present invention, but which is not precisely compatible with existing QIC drives.
Figure 12B:
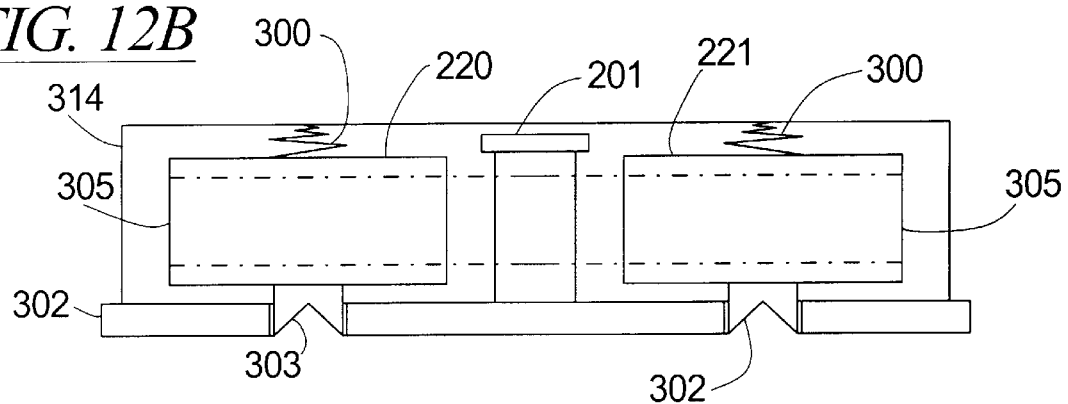

One embodiment for such a new cartridge is described in FIGS. 12A and 12B. The basic principle of driving the tape 200 by using the drive puck 201 and a pressure roller 209 is as described before. The tape 200 is guided from the hub 220a to the hub 221a by several tape guides 301. (For clarity, minor details have been omitted in these drawings).

Although the basic tape moving principle is the same as described in FIGS. 6A–6C, the design and the operation of the hub assemblies are significantly different from the embodiment described in FIGS. 10A–10M and 11. Each of the hubs 220a and 221a is formed basically of a tape reel 305 with a spring 300 on the top and a spindle 303 at the bottom. The spindle is mounted to the bottom of the tape reel 305 and proceeds through the baseplate 302.

Figure 13:
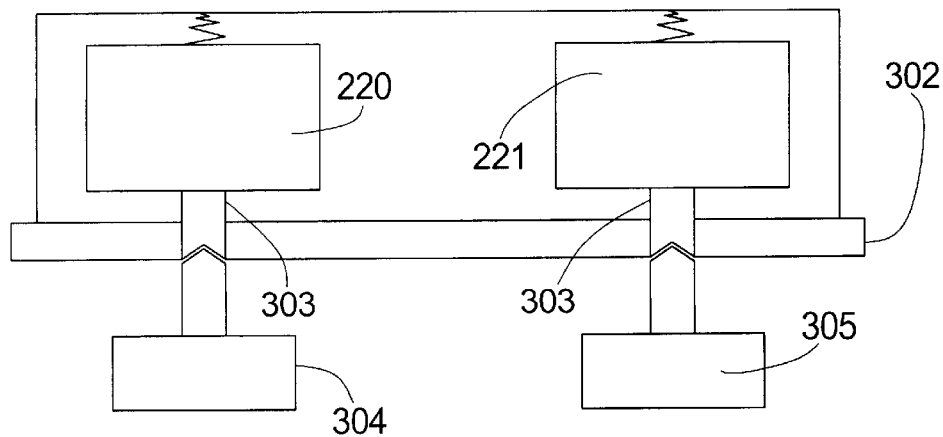
FIG. 13 is a schematic front view of the cartridge of FIGS. 12A and 12B engaging a drive system, in one engagement embodiment.

When the cartridge is not inserted in a tape drive, the springs 300 press the tape reels 220a and 221a towards the bottom of the cartridge. When inserted in a tape drive, electrical motors connect to each hub spindle, pressing the tape hubs (tape reels) upwardly so that each hub is free to rotate. This is shown in FIG. 13. The drive can now move the tape at correct speed by driving the drive puck 201 in the normal way and control tape tension and tape winding through the two electrical motors 304 and 305 (FIG. 12).

Figure 14:
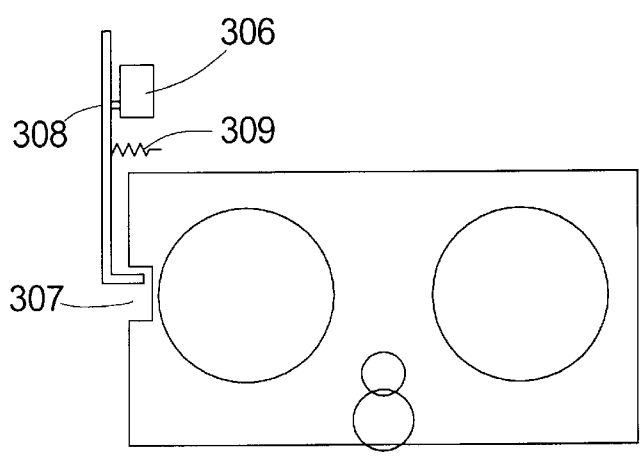
FIG. 14 is a schematic illustration of a cartridge constructed in accordance with the principles of the present invention interacting with an arrangement allowing a tape drive to recognize the cartridge.

If a standard belt driven cartridge (or a cartridge of a design as specified in FIGS. 6A–6C, 10A–10M and 11) is inserted in this tape drive, the two electrical motors 304 and 305 will just glide on the underside of the cartridge baseplate (since there are no connections or openings in the conventional cartridge baseplate). To enable the tape drive to recognize the different cartridges (in order to distinguish between a cartridge which does not require the electrical hub motors to operate and a cartridge which does), the baseplate of the cartridge may be equipped with a slot 307 as shown in FIG. 14. A sensor 306 (for example a small microswitch) is triggered when an arm 308 pulled by a spring 309 in the tape drive slips into the slot 307 when the cartridge is inserted into the tape drive. The current belt driven 3M cartridge does not have such a slot and the inventive cartridge with internally driven hubs as described in FIGS.

6A–6C, 10A–10M and 11 does not require such a slot, since this cartridge operates identically to the conventional belt driven cartridge.

Figure 15A:
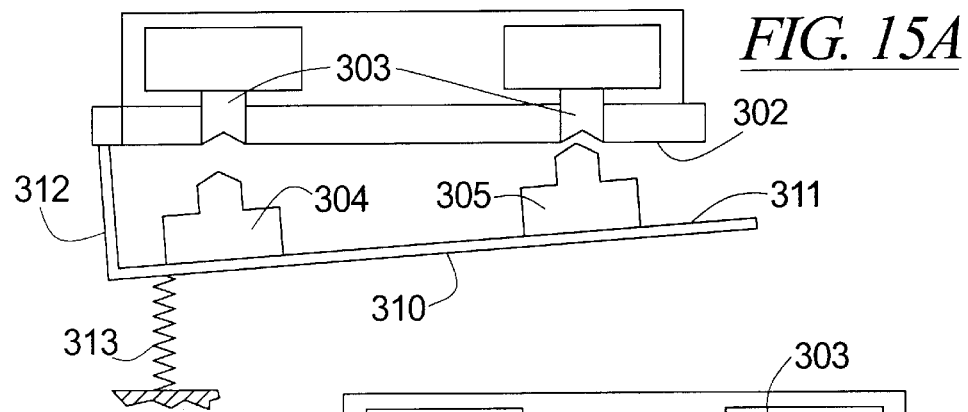
FIGS. 15A and 15B show the engagement embodiment of FIG. 13 in combination with an arrangement for allowing complete engagement only with a cartridge constructed and operating in accordance with the principles of the present invention.

Such a slot 307 can also be utilized to simplify the connection of the two electrical reel motors 304 and 305 in FIG. 13 to the tape reel spindles 303. As shown in FIG. 15A, the two motors are mounted on a fixture 310 which is rotating at one end 311 and has an arm 312 which fits in the slot opening 307 in the cartridge baseplate when the cartridge is inserted. A spring 313 presses the fixture with the two motors upwardly.

If a cartridge without a slot 307 in the baseplate is inserted in the tape drive, the arm 312 will push the fixture 310 downwardly, keeping the motors away from the bottom of the baseplate 302. This is shown in FIG. 15A.

Figure 15B:
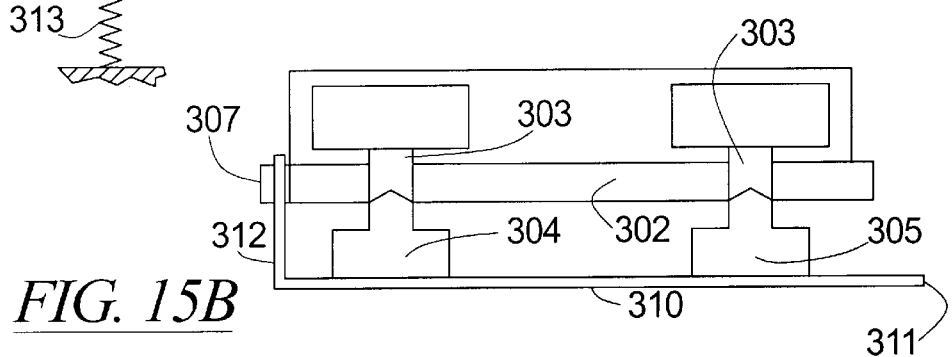

FIG. 15B shows the situation when a cartridge having a slot 307 in the baseplate is inserted into tape drive. The arm 312 slips in to the slot opening 307 and the fixture 310 swings upwardly, driven by the spring 313. The two motors 304 and 305, respectively engage the hub spindles 303 allowing the drive to control tape tension and tape winding directly.

The springs 300 at the top of each hub or tape reel press the respective hubs downwardly toward the cartridge baseplate. This will prevent the tape from becoming loose when the cartridge is withdrawn from the drive. In order to ensure a good, solid locking of the hubs when the cartridge is outside of the drive, the bottom area of the hubs (tape reels) and the corresponding surfaces on the baseplate should be made fairly rough. This will ensure high enough friction force to keep the hubs in place.

The springs 300 can be made so that they reside on the tops of the hubs, and press toward the top housing 314 (in FIG. 12) at exactly the center of each hub spindle. This will reduce friction in the rotating point between the spring 300 and the top cover 314.

Figure 16A:
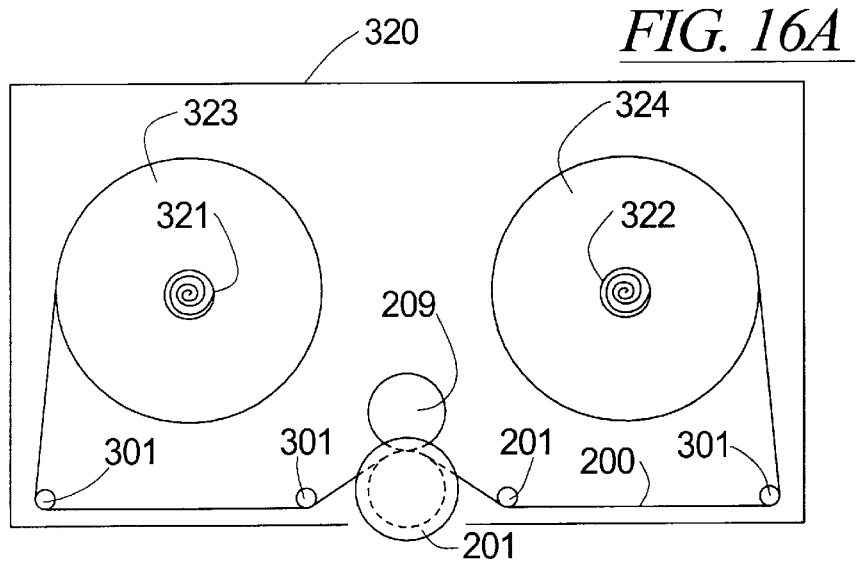
FIGS. 16A and 16B show a further embodiment for drive engagement with a cartridge constructed in accordance with the principles of the present invention, employing magnetic coupling.
Figure 16B:
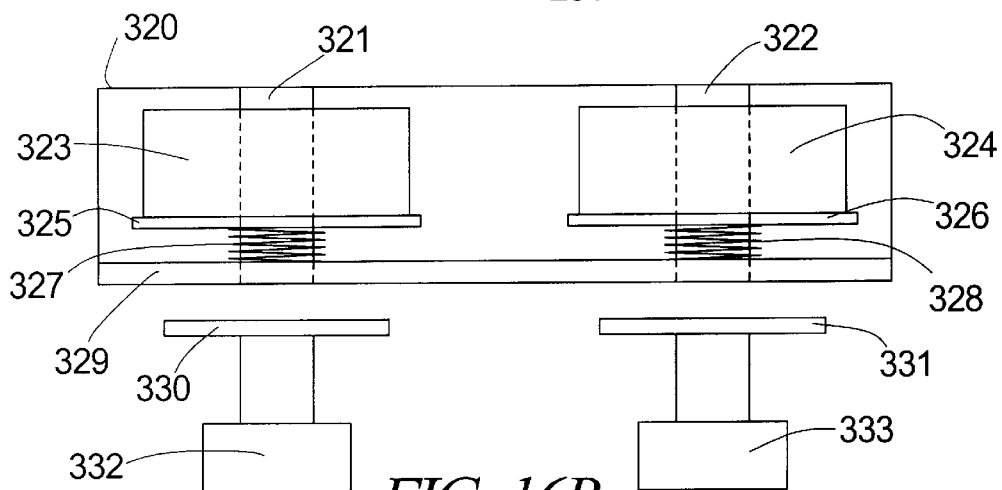

The principle shown in FIG. 12 of designing a cartridge utilizing the basic tape movement invention as described in FIGS. 6A–6C, but with externally driven hubs as shown in FIG. 12, can be taken even one step further, by introducing a contactless hub driving system. The basic principle is shown in FIGS. 16A and 16B. The tape driving principle is the same as already described in FIGS. 6A–6C, however, the tape hubs are now driven by external electrical motors coupled to the hubs by magnets.

In FIGS. 16A and 16B, the two hubs or tape reels 323 and 324 are rotating around hub spindles 321 and 322. These hub spindles 321 and 322 are fixed to the baseplate 329. Springs 327 and 328 between the bottom of the hubs and the cartridge baseplate 329 press the hubs toward the top cover 320 when the cartridge is not inserted in a tape drive. This will keep the hubs from rotating when the cartridge is not inserted in a tape drive.

The tape movement is the same as already described in FIGS. 6A–6C, using the drive puck 201 and the roller wheel 209 to move the tape 200 in a controlled way. Guides 301 control the tape path inside the cartridge.

At the bottom of each hub 323 and 324 are respective disk plates 325 and 326. These plates 325 and 326 are either designed as a magnet (with north and south elements) or can be designed as a disk containing sectors of magnetically sensitive materials with sectors of non-sensitive materials in between. Examples are shown in FIGS. 17A and 17B. FIG. 17A shows a composite disk wherein sectors 334 are magnetically sensitive, while sectors 335 are non-magnetic. FIG. 17B shows a disk made with a series of magnetic elements, characterized as N-S elements. It is also possible to utilize other forms of magnetically sensitive disks.

When the cartridge is inserted in the tape drive, two electrical motors 332 and 333 are placed directly under the hubs as shown in FIG. 16. Each motor is equipped with a magnetic disk 330 and 331 like the one described in FIG. 17B at the end of its spindle. The disks are placed closed to the baseplate. The center of each motor spindle is fined up so it exactly matches the center of the corresponding hub spindle. When the motors starts to rotate, the magnetic disks 330 and 331 will couple magnetically to the hub disks 327 and 328 respectively, and drive these hubs.

Therefore, the drive is able to control tape tension and tape movement in the same way as already described in FIG. 12A and 12B for a similar system where the motors physically engage with the hub spindles.

The magnetic coupling between the disks pairs 327–330 and 328–331 must be strong enough to ensure proper tape tension and tape movement, however, the forces must be less than the tape driving force K (see FIGS. 9A and 9B).

As mentioned in the introductory description of belt driven cartridges (see FIGS. 1A–1C), each cartridge is equipped with a mirror system which detects special holes in the tape. Such holes are punched during tape manufacturing at the beginning area or end area of each tape.

The cartridges described in this invention also needs to utilize such a mirror and hole system to detect the beginning and end of each tape. This can be done in the same way as for the standard belt driven cartridge.

A problem with the punching of physical holes in the tape, however, is that these holes may be torn during operation, creating a possibility for tape breakage just through a hole. When winding, the holes also may interfere with the layers of tape closest to the holes, distorting The magnetic properties around the area which touches the holes.

It is possible to avoid these problems by eliminating the punching of the physical holes at the beginning and end of the tapes. Instead, as shown in FIG. 18, a precise laser 400 can direct a laser beam 401 onto a rope 402 to burn away the magnetic material 403 in the place where each "hole" shall be. The clear base film material will not be burned through. Therefore, light will be able to pass through the areas 404 where the dark magnetic material 403 is burned away, while avoiding a physical hole through the tape.

This principle of creating "holes" (i.e., light-transmissive areas) in the tape by utilizing a laser can of course be used for both the standard belt driven cartridge as it exists today and for any new tape cartridge (including those described herein) which requires one or more "holes" to let light pass through.

Although modifications and changes may be suggested by those skilled in the art, it is the intention of the inventor to embody within the patent warranted hereon all changes and modifications as reasonably and properly come within the scope of his contribution to the art.

I claim as my invention:

1. A magnetic tape cartridge comprising:

a housing having a base and a recess;

a first hub and a second hub each rotatably mounted on said base in said housing;

a magnetic tape carried on said first hub and said second hub in said housing so as to be wound from said first hub onto said second hub in a first transport direction and unwound from said second hub onto said first hub in a second transport direction opposite said first transport direction;

a drive puck rotatably mounted on said base in said housing and having a circumferential portion accessible from an exterior of said housing through said recess, said drive puck being disposed in said housing in direct contact with said tape for moving said tape in said first transport direction upon rotation of said drive puck in a first rotational direction and for moving said tape in said second transport direction upon rotation of said drive puck in a second rotational direction opposite said first rotational direction; and roller wheel means rotatably mounted in said housing adjacent said drive puck with said tape being disposed between said roller wheel means and said drive puck and in contact with said roller wheel means, for exerting a force on said tape for maintaining said tape in said direct contact with said drive puck during rotation of said drive puck.

2. A magnetic tape cartridge as claimed in claim 1 wherein said roller wheel means comprises a roller wheel composed of resilient material and having a roller wheel surface in contact with said tape.

3. A magnetic tape cartridge as claimed in claim 1 wherein said roller wheel means comprises:

a roller wheel having a circumferential surface in contact with said tape;

an axle around which said roller wheel rotates;

a bracket through which said axle extends and through which said roller wheel rotates; and a spring having a first end attached to said bracket and a second end, opposite said first end, fixedly mounted in said housing for biasing said roller wheel against said drive puck.

4. A magnetic tape cartridge as claimed in claim 3 wherein said bracket and said spring are disposed substantially co-linearly.

5. A magnetic tape cartridge as claimed in claim 3 wherein said bracket has an L-shape and includes a bracket leg, means for pivotably mounting one end of said bracket leg in said housing, and wherein said second end of said spring is attached to said bracket leg.

6. A magnetic tape cartridge as claimed in claim 1 wherein said magnetic tape has a tape height in a direction substantially perpendicular to said first and second transport directions, and wherein said drive puck comprises a circumferential surface in said direct contact with said tape, said circumferential surface having a height substantially equal to said height of said tape.

7. A magnetic tape cartridge as claimed in claim 1 wherein said drive puck comprises a first circumferential surface having a first diameter and a second circumferential surface having a second diameter, said second diameter being less than said first diameter, and wherein said drive puck is in said direct contact with said tape at said second circumferential surface.

8. A magnetic tape cartridge as claimed in claim 7 wherein said tape has a tape height in a direction substantially perpendicular to said first and second transport directions, and wherein said second circumferential surface has a height substantially equal to said height of said tape.

9. A magnetic tape cartridge as claimed in claim 1 wherein said drive puck has a circumferential surface in said direct contact with said tape, said circumferential surface having a radius in a range between 8.5 and 8.6 mm.

10. A magnetic tape cartridge as claimed in claim 1 wherein said drive puck has a circumferential surface in said direct contact with said tape, said circumferential surface having a radius of approximately 7.92 mm.

11. A magnetic tape cartridge as claimed in claim 1 wherein one rotation of said drive puck in said first rotational direction or said second rotational direction respectively moves said tape 54.7 mm in said first transport direction or said second transport direction, respectively.

12. A magnetic tape cartridge as claimed in claim 1 wherein one rotation of said drive puck in said first rotational direction or said second rotational direction respectively moves said tape 38.3 mm in said first transport direction or said second transport direction, respectively.

13. A magnetic tape cartridge as claimed in claim 1 wherein rotation of said drive puck in each of said first and second rotational directions imparts a transport force to said tape, and wherein said first hub comprises means for applying a first hub braking force to said first hub opposite to a direction of rotation of said first hub for tensioning said tape when said tape is moving in said first transport direction, and wherein said second hub comprises means for applying a second hub braking force to said second hub opposite a direction of rotation of said second hub for tensioning said tape when said tape is moving in said second transport direction, each of said first hub braking force and said second hub braking force being less than said transport force.

14. A magnetic tape cartridge as claimed in claim 1 further comprising a first drive wire entrained around said first hub for rotating said first hub to move said tape in said first and second transport directions, a second drive wire entrained around said second hub for moving said tape in said first and second transport directions, and a driving connection between each of said first drive wire and said second drive wire and said roller wheel means.

15. A magnetic tape cartridge as claimed in claim 14 wherein said roller wheel means comprises a roller wheel having a first circumferential surface in said direct contact with said tape, and wherein said driving connection comprises a second circumferential surface of said roller wheel around which each of said first drive wire and said second drive wire is entrained.

16. A magnetic tape cartridge as claimed in claim 14 wherein said roller wheel means comprises a roller wheel having a first circumferential surface in said direct contact with said tape, and wherein said driving connection comprises a second circumferential surface of said roller wheel and a drive wheel having a first circumferential surface around which said first drive wire and said second drive wire are entrained and a second circumferential surface, and a third drive wire entrained around said second circumferential surface of said drive wheel and said second circumferential surface of said roller wheel.

17. A magnetic tape cartridge as claimed in claim 14 wherein said first hub comprises a center axle fixedly mounted to said base, a hub body having a tubular cylindrical section through which said hub shaft extends and which is rotatable around said hub shaft, and a top flange and a bottom flange connected to said hub body, and a tape reel on which said tape is wound, said tape reel having a central section surrounding and spaced from said cylindrical section of said hub body, and wherein said means for applying a first hub braking force comprises:

a series of ratchet teeth disposed at a circumference of said top flange;

a flange ring surrounding said series of ratchet teeth at said circumference of said top flange, said first drive wire being entrained around an exterior of said flange ring and said flange ring having an inner circumference facing said series of ratchet teeth at said circumference of said top flange;

a spring assembly having a top spring and a bottom spring embracing said top flange at said circumference of said top flange, said top and bottom springs being connected to each other by and pivotable around a pin extending through said flange ring parallel to said inner circumference, and a block extending between said top and bottom springs and disposed between said series of ratchet teeth at said circumference of said top flange and said inner circumference of said flange ring;

said inner circumference of said flange ring having a recess therein; and a friction-producing spring disposed between an exterior of said cylindrical section of said hub body and said central section of said reel, said first drive wire causing said flange ring to rotate in a direction for unwinding said tape from said reel when said drive puck is rotated in said first rotational direction and causing said block to catch one of said series of ratchet teeth so that said hub body co-rotates with said flange ring with said reel being rotationally dragged with said hub body via said friction force of said spring disposed between said hub body and said reel for producing said first hub braking force, and said flange ring being rotated in an opposite direction by said first drive wire when said drive puck is rotated in said second rotational direction, causing said block to reside in said recess in said flange ring allowing substantially free rotation of said hub body on said hub shaft.

18. A magnetic tape cartridge as claimed in claim 17 wherein said means for applying said first hub braking force further comprises a further series of ratchet teeth disposed at a circumference of said bottom flange, and a further spring assembly, identical to said spring assembly, said pin of said further spring assembly being fixed in said base, and said further spring assembly embracing said bottom flange.

19. A magnetic tape cartridge as claimed in claim 14 wherein said second hub comprises a center axle fixedly mounted to said base, a hub body having a tubular cylindrical section through which said hub shaft extends and which is rotatable around said hub shaft, and a top flange and a bottom flange connected to said hub body, and a tape reel on which said tape is wound, said tape reel having a central section surrounding and spaced from said cylindrical section of said hub body, and wherein said means for applying a first hub braking force comprises:

a series of ratchet teeth disposed at a circumference of said top flange;

a flange ring surrounding said series of ratchet teeth at said circumference of said top flange, said second drive wire being entrained around an exterior of said flange ring and said flange ring having an inner circumference facing said series of ratchet teeth at said circumference of said top flange;

a spring assembly having a top spring and a bottom spring embracing said top flange at said circumference of said top flange, said top and bottom springs being connected to each other by and pivotable around a pin extending through said flange ring parallel to said inner circumference, and a block extending between said top and bottom springs and disposed between said series of ratchet teeth at said circumference of said top flange and said inner circumference of said flange ring;

said inner circumference of said flange ring having a recess therein; and a friction-producing spring disposed between an exterior of said cylindrical section of said hub body and said central section of said reel, said second drive wire causing said flange ring to rotate in a direction for unwinding said tape from said reel when said drive puck is rotated in said second rotational direction and causing said block to catch one of said series of ratchet teeth so that said hub body co-rotates with said flange ring with said reel being rotationally dragged with said hub body via said friction force of said spring disposed between said hub body and said reel for producing said second hub braking force, and said flange ring being rotated in an opposite direction by said second drive wire when said drive puck is rotated in said first rotational direction, causing said block to reside in said recess in said flange ring allowing substantially free rotation of said hub body on said hub shaft.

20. A magnetic tape cartridge as claimed in claim 19 wherein said means for applying said first hub braking force further comprises a further series of ratchet teeth disposed at a circumference of said bottom flange, and a further spring assembly, identical to said spring assembly, said pin of said further spring assembly being fixed in said base, and said further spring assembly embracing said bottom flange.

21. A magnetic tape cartridge as claimed in claim 1 wherein each of said first hub and said second hub has a drive connection adapted for direct engagement with a drive shaft of a drive motor.

22. A magnetic tape cartridge as claimed in claim 1 wherein each of said first hub and said second hub has a drive connection adapted for indirect coupling with a drive shaft of a drive motor.

23. A magnetic tape cartridge as claimed in claim 22 wherein each of said first hub and said second hub has a drive connection adapted for magnetic coupling with a drive shaft of a drive motor.

* * * * *